US005491695A

United States Patent [19]
Meagher et al.

[11] Patent Number: 5,491,695
[45] Date of Patent: Feb. 13, 1996

[54] MEANS AND METHOD OF DIAL UP BRIDGING OF NETWORK FOR HIGH BANDWIDTH DIGITAL COMMUNICATION

[75] Inventors: John L. Meagher, Reston; Charles E. Rothrauff, Sterling; Trey Alexander, Reston, all of Va.

[73] Assignee: Digital Access Corporation, Reston, Va.

[21] Appl. No.: 959,902

[22] Filed: Oct. 13, 1992

Related U.S. Application Data

[63] Continuation-in-part of Ser. No. 774,935, Oct. 11, 1991, abandoned, and a continuation-in-part of Ser. No. 906,324, Jun. 30, 1992, abandoned, which is a continuation-in-part of Ser. No. 731,042, Jul. 17, 1991, abandoned.

[51] Int. Cl.$^6$ .................................................. H04J 3/04
[52] U.S. Cl. ........................ 370/112; 370/62; 370/84; 379/202; 379/389
[58] Field of Search ........................ 370/112, 84, 85.5, 370/85.12, 110.4, 118, 62; 379/53, 54, 389, 395, 202; 358/432, 433; 348/15, 14, 16

[56] References Cited

U.S. PATENT DOCUMENTS

| | | | |
|---|---|---|---|
| 4,115,659 | 9/1978 | Spanel et al. | 379/389 |
| 4,531,024 | 7/1985 | Colton et al. | 348/15 |
| 4,977,590 | 12/1990 | Milovancevic | 379/395 |
| 5,014,267 | 5/1991 | Tompkins et al. | 370/62 |
| 5,065,396 | 11/1991 | Castellano et al. | 370/84 |
| 5,184,345 | 2/1993 | Sahni | 379/53 |
| 5,218,627 | 6/1993 | Corey et al. | 379/202 |
| 5,381,412 | 1/1995 | Otani | 370/112 |

*Primary Examiner*—Douglas W. Olms
*Assistant Examiner*—Shick Hom
*Attorney, Agent, or Firm*—Armstrong, Westerman, Hattori, McLeland & Naughton

[57] ABSTRACT

A high bandwidth data loop employs a plurality of individual circuits of a telephone network using a dialing inverse multiplexer communications device. The dialing inverse multiplexer is capable of selectively accessing ones of the plurality of circuits so as to provide any selected bandwidth or bit rate up to the total number of circuits which can be handled by the dialing inverse multiplexer communications device, between any number of locations, for any selected period of time or for any indeterminate period of time.

28 Claims, 32 Drawing Sheets

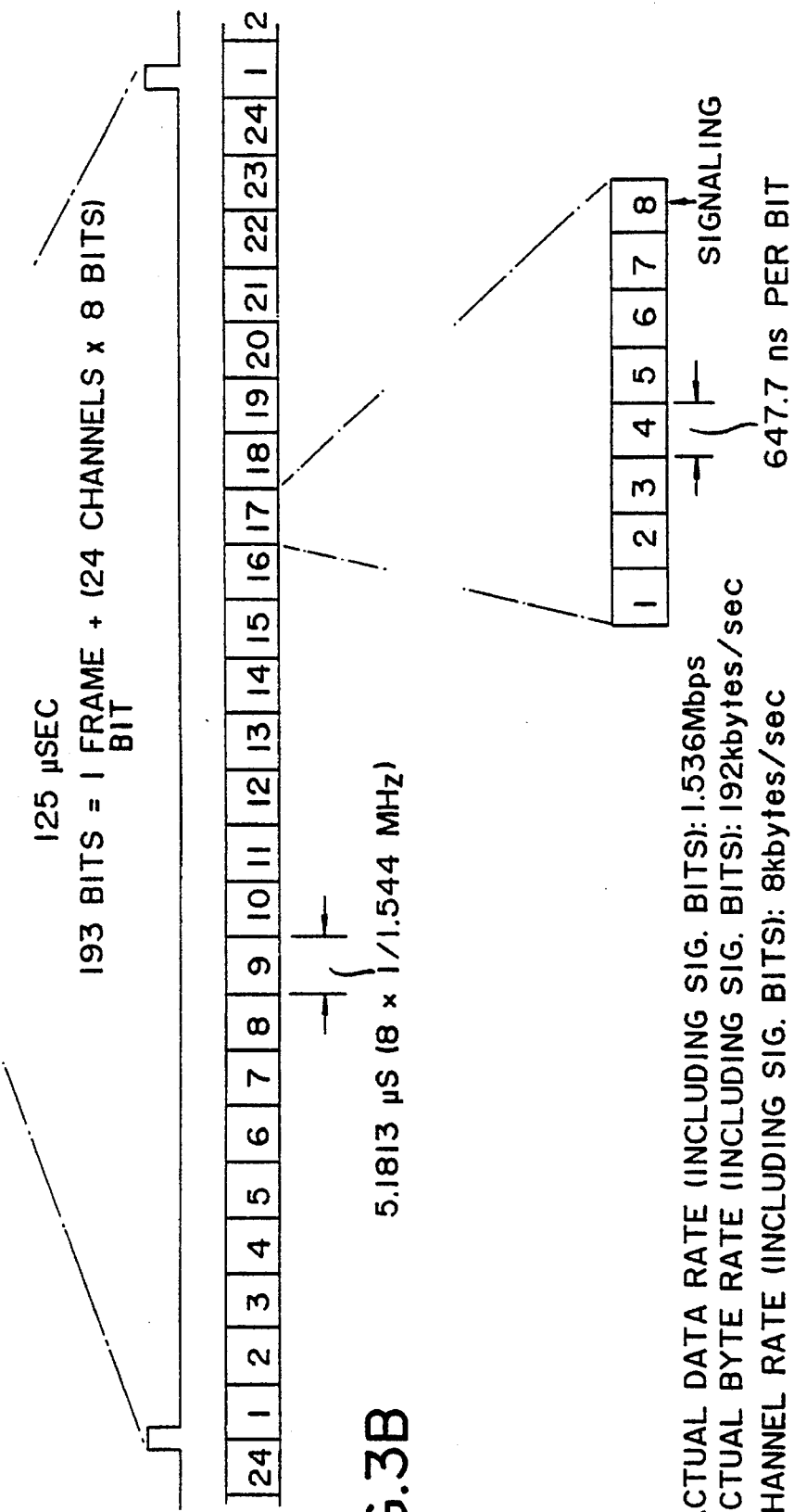

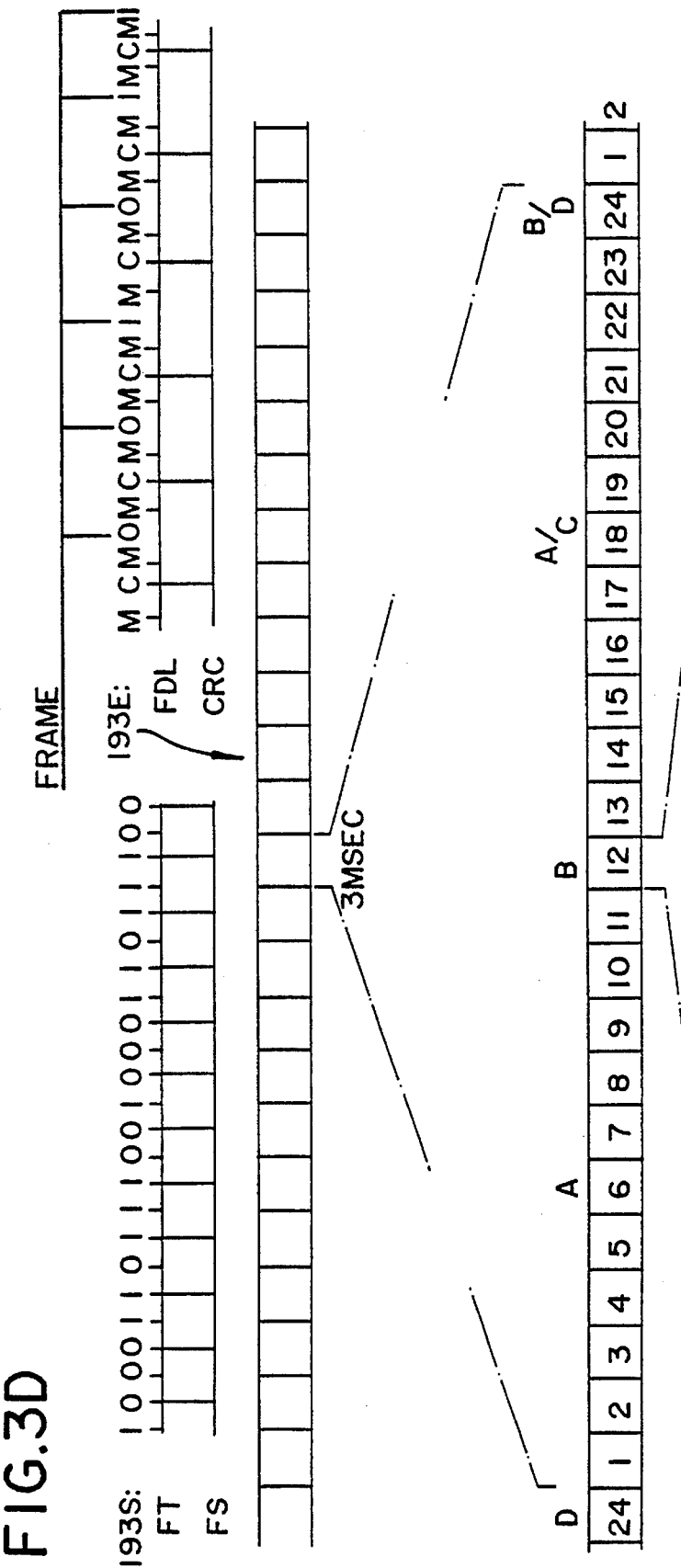

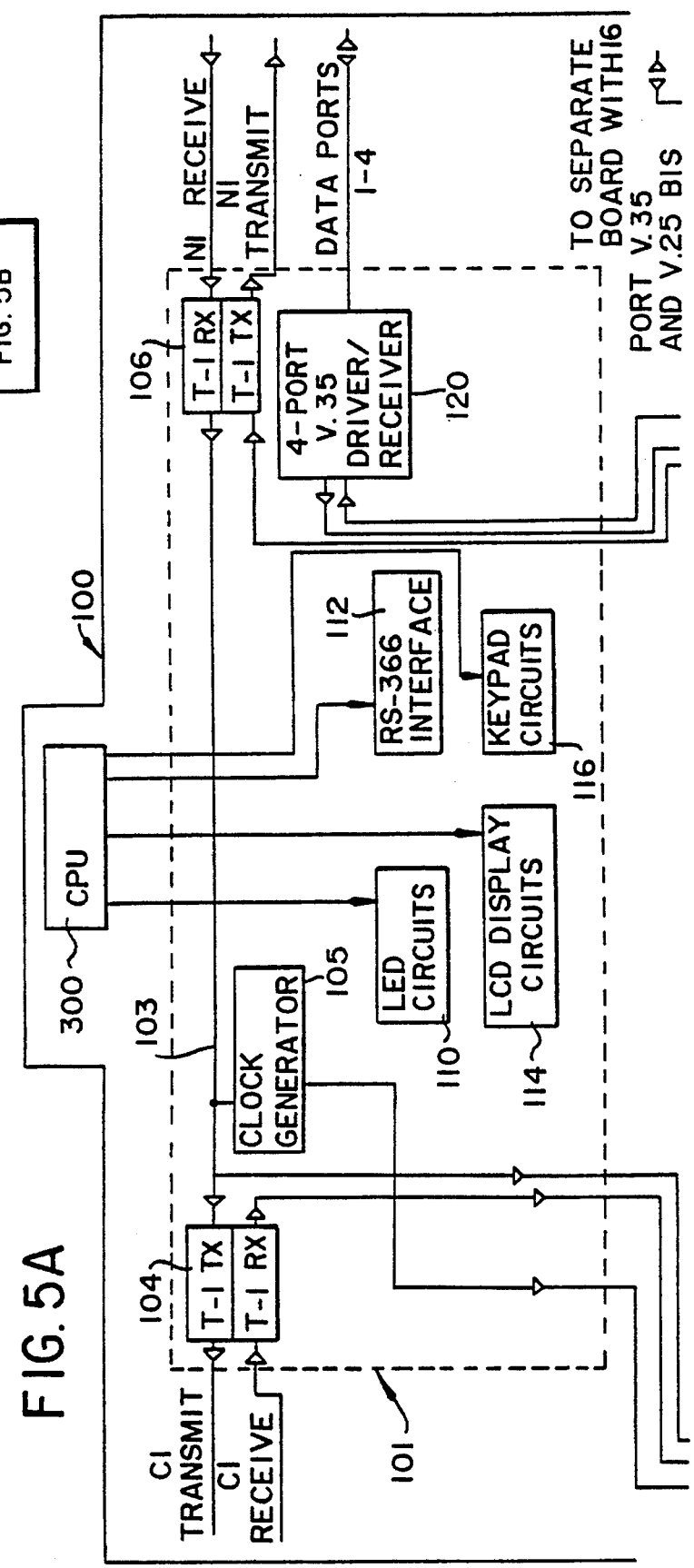

LEGEND

OBSERVER-A,B,C,D & E OR F CLOSED

SPEAKER-A,B,E,G CLOSED

PREVIOUS C,D,F,H CLOSED

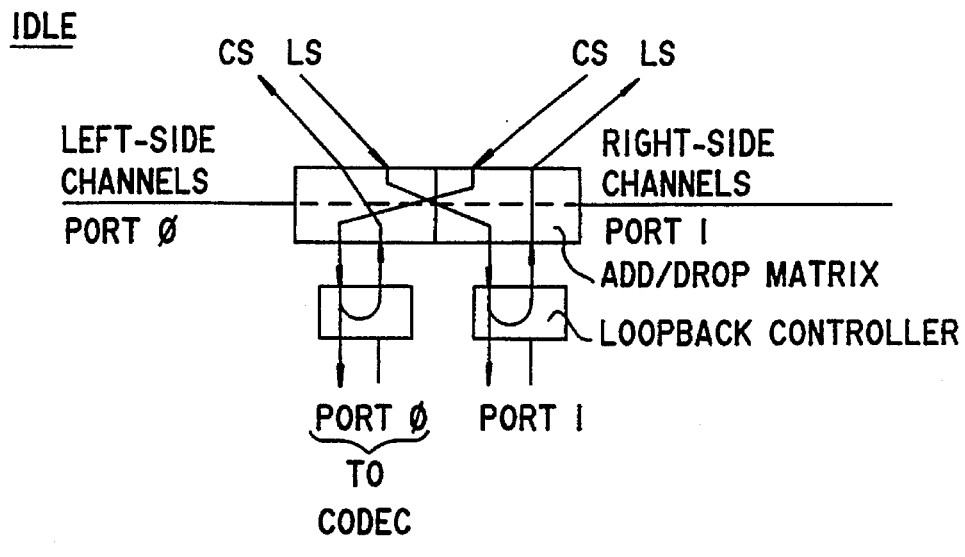
FIG.17A
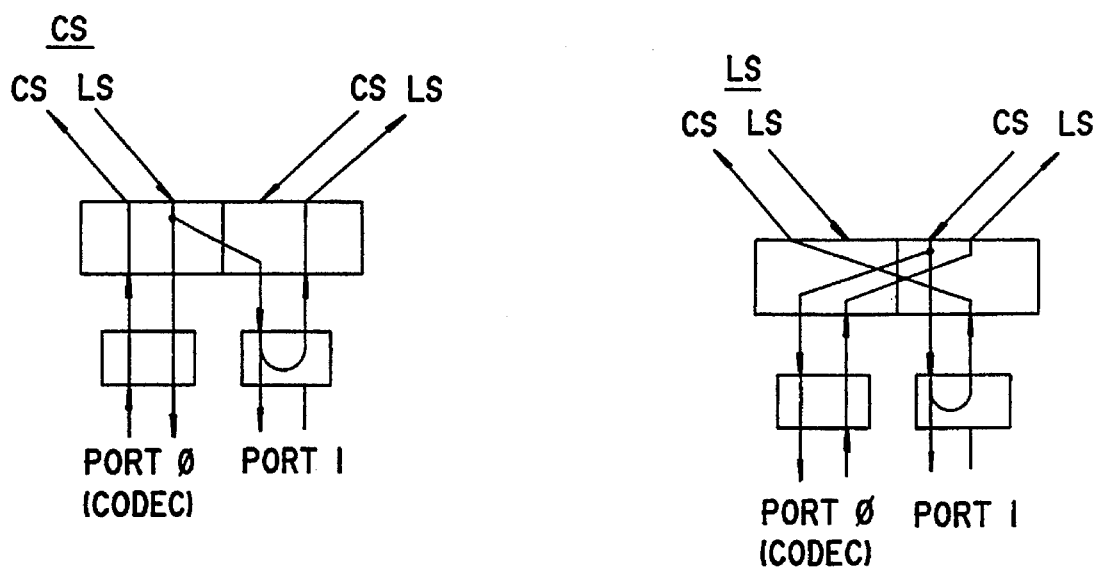
FIG.17B
FIG.17C

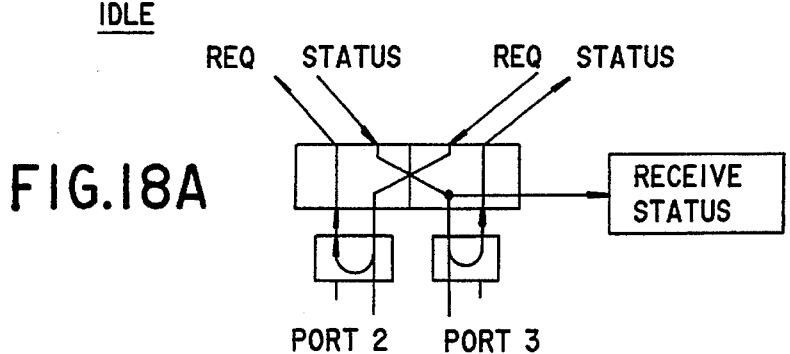
FIG.18A  IDLE
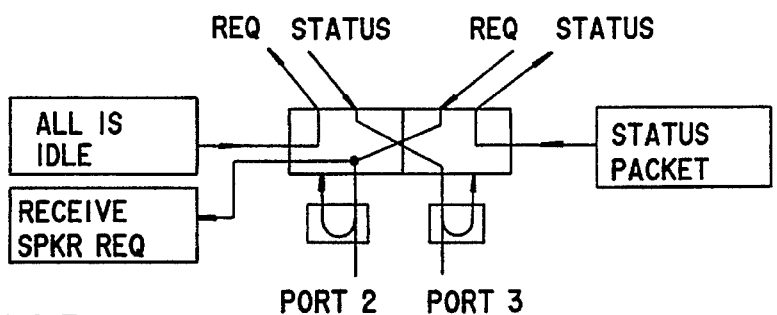
FIG.18B  MASTER UNIT
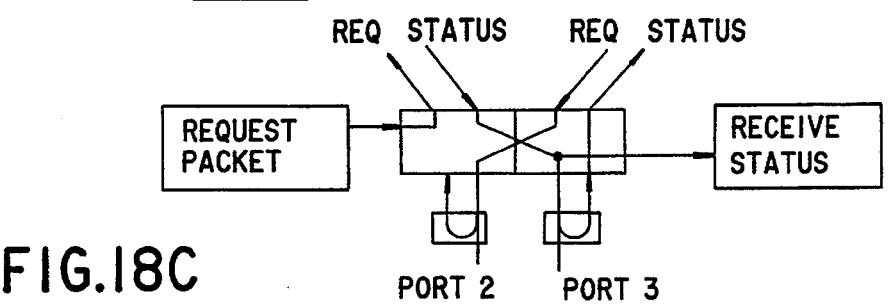
FIG.18C  REQUEST
FIG.18D
REQUEST PACKET (FOR 8KB MESSAGE)
20 BITS
01111111111101111 NNNN
STATUS PACKET
0111111110 CCCC LLLL
N = NODE ID
C = CURRENT SPKR
L = LAST SPKR

MEANS AND METHOD OF DIAL UP BRIDGING OF NETWORK FOR HIGH BANDWIDTH DIGITAL COMMUNICATION

CROSS REFERENCE TO RELATED APPLICATION

This application is a continuation-in-part of a application entitled "Dial-up Bridging Method and Apparatus Therefor", filed on Oct. 11, 1991, having as its inventors John L. Meagher, Charles E. Rothrauff, and Trey Alexander, and having U.S. Ser. No. 07/774,935 now abandoned. This application is also a continuation-in-part of a application entitled "Apparatus for High Speed Data Transfer", filed on Jun. 30, 1992, having as its inventor Charles E. Rothrauff and having U.S. Ser. No. 07/906,324, now abandoned, which is a continuation-in-part of "Apparatus for High Speed Data Transfer", filed on Jul. 17, 1991, having as its inventor Charles E. Rothrauff and having U.S. Ser. No. 07/731,042 now abandoned. These applications are hereby referred to and their disclosures are expressly incorporated herein by reference.

TECHNICAL FIELD

The present invention relates to the field of data communications. In particular, the present invention relates to the field of providing a communications loop or network connecting two or more users using communications networks having relatively narrow bandwidth time division multiplexed channels. The invention also relates to providing a communications loop or network connecting two or more users using wideband communications, in which a plurality of time division multiplex channels are used having bandwidths which are individually insufficiently large to individually support the wideband communications. This provides a virtual 'bridge' without requiring a plurality of channels to be obtained which occupy consecutive multiplex timeslots.

BACKGROUND OF THE INVENTION

Video teleconferencing arrangements are known which convert analog video signals into digital data to be carried on telecommunications lines. For video teleconferencing, the coder portion of a video CODEC (COder/DECoder) converts an analog input signal into output binary bits. At the receiving end, a CODEC converts the binary bits back to analog signals. Due to the high bandwidth requirements for acceptable video quality of the received video signals, a plurality of DS0 telecommunications channels are required for each video signal.

For video teleconferencing involving several locations, a video "bridge" is known. In this arrangement, a central unit (serving as the bridge) receives video signals from each of the locations, and transmits video signals to all of the locations. This imposes a relatively expensive hardware requirement for the bridge apparatus, since it must be capable of simultaneously handling many different signals, and must be capable of re-broadcasting a given signal to each of the plurality of locations. For example, in the prior art, bridge boxes are used for CODECs at a cost of about $80,000. Each prior art bridge box is a single central unit which sends out a plurality of signals. In the present invention, the bridge is distributed over all of the commercially available dialing inverse multiplexer units (the commercially available dialing inverse multiplexer unit corresponds to that shown and described in the above-identified co-pending application having U.S. Ser. No. 07/906,324), and is sold under the commercial name Fracdial™) at their separate locations. The prior art bridges are limited by their processing speed or by the number of ports built in. This in turn limits the number of ports which can be handled. Thus, in the conventional bridging apparatus, the total number of locations which can be handled is fixed by the bridging hardware itself.

It is a problem in the art to provide an apparatus and method for use thereof, which is not limited by the capacity of a single unit, but which provides a distributed conference network capacity. It is a further problem in the art to provide a conference network enabling communication with a plurality of locations in a network loop, in which each location can selectively serve to originate and terminate the network loop.

Digital communications can be carried on commercially available T-1 communication lines. Such communication lines are described in tariff #270 filed by AT&T in 1982, which covers High Capacity Terrestrial Digital Service (HCTDS). According to this tariff, a T-1 communication line has a data transmission capability of 1.544 Mbps. A T-1 frame consists of 24 8-bit DS0 channels. The T-1 transmission rate utilizing DS-1 signalling can transmit 8000 frames per second, at 193 bits per frame, which yields a transmission rate of 1.544 Mbps. In a T-1 communication line link, DS-1 signalling is used. According to this type of signalling, the 24 channels, each of which comprise separate data streams, are transmitted as a single frame. Each channel contains 8 bits, for a total of 192 bits per frame. One additional bit is used in each frame for synchronization purposes, and accordingly a frame is actually composed of 193 bits. According to this standard, the rate of 8000 frames per second can be transmitted.

In many telephone systems, "robbed bit" signalling is used, which further reduces the usable capacity of each DS0 channel from 8 bits per frame to 7 bits per frame, reducing the capacity of a full frame from 192 bits to 168 bits, and thereby yielding a useful transmission rate of 1.344 Mbps. A DS0 can accommodate 64 kbps of bandwidth (8 bits×8000 frames/sec). However, when "robbed bit" signalling is used to indicate on-hook and off-hook states, only 56 kbps of bandwidth is guaranteed to be switched for any DS0.

For higher speed transfer than that available by a single DS0 channel, it is known to employ a plurality of DS0 channels which are located together physically along the same telecommunications route. Such high data rate communications are needed by, for example, video teleconferencing applications. For such data communications, however, it has been necessary to co-route all of the plurality of DS0 channels to guarantee simultaneous arrival without differences in propagation delay along diverse routes.

A typical interface provided for a T-1 multiplexer to an end user is the V.35 interface. For video teleconferencing, a video CODEC is used for converting an analog input signal into output binary bits. At the receiving end, another CODEC converts the binary bits back to analog signals.

In practice, in known devices for sending large amounts of data, a plurality of contiguous DS0 channels must be used. In conventional long distance networks, each telephone circuit carrying the video telecommunications signal would travel by a different path. For example, a telephone communication between New York and California might travel via Atlanta or Chicago, and a large number of other switching paths are also possible. This gives rise to a synchronization problem when using a plurality of telephone channels to transfer large bandwidth data on a plurality of lower bandwidth lines. That is, since the transmitted data may be transmitted via different paths, different transmission times are involved, making it difficult to reassemble in real-time the arriving data into the original large bandwidth signal. This causes substantial delays to arise in setting up video conference calls, due to the necessity of waiting until the requisite number of contiguous T-1 communication lines have been obtained by the telephone company, as explained further below.

In the prior art, for high speed data transmission requiring use of more than one DS0 channel, a plurality of channels must be obtained by the telephone company which occupy consecutive multiplex timeslots. This solution, which is both relatively difficult to implement by the telecommunications company and relatively expensive to purchase, is well-known. In this type of service, a user communicates by telephone with the telecommunications company in advance, to obtain the video conferencing telecommunications service. After a wait of at least several minutes, and occasionally of one-half hour, the requisite number of physically contiguous lines are made available by the telecommunications company for use. This solution is relatively inefficient for the telecommunications company since it is relatively difficult to free up a plurality of consecutive timeslots. It requires an extensive search by the telecommunications company to obtain the requisite number of lines and to keep them clear for a predetermined or unknown length of time. Accordingly, even for a video teleconference of relatively short duration, for example several minutes, a minimum fee for one-half hour of telecommunications company service is often required at present. Additionally, because these lines are dedicated and can only carry the transmissions of the users involved in the video teleconference, the line charges themselves are relatively high.

On present telecommunications lines, a telephone call originating at a first location may be routed by any one of a relatively large number of different telecommunications paths. Once a call has been routed to a receiving facility, the routing is not changed. This establishes fixed delays once the telecommunications path has been established. However, the specific path obtained is unpredictable, and the length of the communications delay is determined by the path length as well as by other factors such as whether a satellite link has been included in the path. This problem of sending large amounts of data over a plurality of non-contiguous telecommunications lines (as opposed to the prior art use of a plurality of channels which must be obtained in advance by the telephone company and which occupy consecutive multiplex timeslots), has only recently been addressed by the development of a dialing inverse multiplexer, as follows.

One commercial device usable for high bandwidth transmission over a plurality of telecommunications lines, which does not require that the telecommunications lines be contiguous, and which serves as a dialing inverse multiplexer, is known commercially by the name Fracdial™. The Fracdial™ device is manufactured by Digital Access Corporation of Reston, Va. This commercial dialing inverse multiplexer operates on all digital circuit-switched networks. These networks include private networks as well as all local exchange and inter-exchange carrier networks, and is compatible with digital switches including digital PBX's. This dialing inverse multiplexer operates by dividing high bandwidth serial data streams into multiple circuits, dialing those circuits across digital, circuit-switched networks, and resynchronizing and reforming them into a serial data stream at the terminating end.

The aforementioned dialing inverse multiplexer is capable of providing a bandwidth over an arbitrarily large or small number of channels up to the limit of the number of channels which can be handled by the switched data service being used, simultaneously dialing up a large number of channels for data transmission, automatically conducting a standard error rate test on each of a plurality of channels, taking out of service any channels which fail the standard error rate test.

Further, it is also a problem in the art to provide a method of using an improved dialing inverse multiplexer, to form a network or loop using telecommunication lines among a plurality of different locations each having a like dialing inverse multiplexer device.

Moreover, it is also a problem in the art to provide a method of using an improved ,dialing inverse multiplexer, to form a network or loop among a plurality of different locations each having a like dialing inverse multiplexer device, the network or loop requiring a bandwidth greater than the capacity of a single channel, without requiring use of consecutive channels, physically contiguous telephone lines, or dedicated lines.

Also, it is a problem in the art to provide a method of using a plurality of dialing inverse multiplexers to form a network or loop among a plurality of different locations to provide a distributed conferencing network capacity for carrying data.

SUMMARY OF THE INVENTION

Accordingly, it is an object of the present invention to provide an apparatus and method for use thereof, which is not limited by the capacity of a single unit, but which provides a distributed conferencing network capacity for carrying data.

It is another object of the present invention to provide an apparatus which enables telecommunication of data signals along a closed path using a plurality of dialing inverse multiplexers.

It is a still further object of the present invention to provide an apparatus usable in a conference network enabling communication with a plurality of locations in a network loop, in which each location can selectively serve to originate and terminate the network loop.

Accordingly, it is an object of the present invention to provide a conferencing network, which is also referred to hereafter a dial-up bridge, which uses a plurality of dialing inverse multiplexers capable of large bandwidth, high speed data communications which travel on a plurality of DS0 channels, and which need not travel on consecutive multiplex timeslots.

The networking arrangement according to the present invention requires a plurality of dialing inverse multiplexer devices, in which each dialing inverse multiplexer can perform the following tasks: (a) independently receive data on a T-1 telecommunications line, (b) independently transmit on a T-1 telecommunications line, and (c) allow a received transmission to be replicated and retransmitted on a T-1 telecommunications line.

The networking arrangement according to the present invention also requires a control device, such as a digital central processing unit (CPU) and a hardware switching arrangement, which controls switching of the data at each of the plurality of dialing inverse multiplexer devices, so that each of the dialing inverse multiplexers properly serves as a speaker or as a listener. The dialing inverse multiplexers can serve as a listener by reading the incoming data and replicating it without alteration for retransmission. One of the dialing inverse multiplexers can serve as a speaker by supplying its own original transmission, instead of reading any incoming data or replicating such incoming data.

The conferencing network or dial-up bridge according to the present invention uses a plurality of dialing inverse multiplexer devices at different locations to form a dial-up network which can be in the form of an open loop or a closed loop.

The function of each of the individual dialing inverse multiplexers forming the dial-up bridge according to the present invention can be controlled, for example, so that it is a listener or a speaker, by use of some common control device (using, for example, encoded data broadcast with the transmitted data or broadcast along a separate pathway unrelated to the network transmissions), or by use of independent switches at each of the dialing inverse multiplexers (i.e., manually-actuated or voice-actuated switches). The control signal can be supplied with the data stream in situations where this relatively minor disruption of the data stream would be acceptable, e.g. in videoconferencing applications, etc.

The dial-up bridge according to the present invention is therefore not a single device, but instead can be considered to be distributed over all of the involved dialing inverse multiplexer units at their separate locations or nodes. Further, unlike the above-described known video bridge, the dial-up bridge according to the present invention has a capacity directly proportional to the number of nodes.

In an embodiment of the dial-up network according to the present invention (e.g., in a loop or bus arrangement), information can be 'dropped off' at any of the dialing inverse multiplexers on the loop or bus. Also, the dialling operations establishing the dial-up network (virtual bridge) of the present invention can be performed either "in-band" or alternatively dialing can occur externally and not "in-band". Where dialing can occur externally and not "in-band", the external control signal can reach each unit independently of the data being transmitted. In-band dialing occurs when the dialing inverse multiplexer receives dialing instructions embedded in a control packet received from another node. In particular, the control packet would be received on one of the same DS0 channels normally used for transfer of the customer's high speed data or program material. Alternatively, dialing commands may be received by any node via a completely independent control port connected by any communication path (even an analog telephone path) to a distant control point. In the present embodiment, where a Fracdial™ brand dialing inverse multiplexer is used, the Fracdial™ dialing inverse multiplexer is equipped with a serial RS-232 control port which can be used for this purpose.

Once a loop or bus is dialed and set up by connection and synchronization has been established between each connected pair of dialing inverse multiplexer units, the loop so formed can replicate received data and re-transmit this data downstream throughout the network.

The aforementioned switches used for determining whether a given one of the dialing inverse multiplexers is a speaker or listener can be push-talk switches. Such switches, when actuated, change which unit transmits data and which unit receives data. The dialing inverse multiplexers can be controlled so that the push-talk switch is controlled at a single one of the locations of the dialing inverse multiplexers, or they can, if desired, be controlled so that control of which unit transmits is rotated among all the units. Further, such switches need not be 'push-talk' switches but can, if desired, be "talk" switches which are voice actuated rather than manually actuated.

Regardless of how the loop is connected, for video teleconferencing purposes the 'speaker' can either receive its own transmission signals for display, or can instead receive the signals of any designated other party, e.g. the last speaker other than the sender, a predetermined one of the listeners, or a listener selected by any other desired method. It is preferable that the speaker receive a transmission from a source other than itself, and in one preferred arrangement, the speaker while speaking simultaneously receives the transmission from the previous (i.e., the last) speaker, so that all listeners see the speaker but the speaker alone sees the last (previous) speaker. In computer networking applications, it may be useful to have the data return after traversing the loop so that it can be checked for errors.

The circuits used in the dial-up bridge according to the present invention are duplex, that is they can send or receive at the same time. Each loop is bidirectional (e.g. duplex). Each set of circuits is a full duplex set.

The bridging apparatus and method according to the present invention can employ dialing inverse multiplexers similar to that of the above-noted commercially available dialing inverse multiplexer, known commercially by the name Fracdial™, but wherein different software is used in conjunction with hardware modifications to achieve the above-described advantageous features. Such hardware changes include provision of additional input/output ports, and additional controls to enable switching among different ones of the units connected in a conference network.

The present invention is not limited to use with a public telephone network offering T-1 services, but can be used with other services as well, such as proposed new T3 services such as SMDS (Switched Multimegabit Digital Services) which may in the future be provided by a public telephone company.

The invention will be described in greater detail below with reference to embodiments which are illustrated in the drawings.

BRIEF DESCRIPTION OF THE DRAWINGS

FIGS. 3A–3D show framing organization of data according to T-1 standards, as used in the above-noted commercially available dialing inverse multiplexer.

FIGS. 5(A)–(B) is a block diagram of circuit elements used in the above-noted commercially available dialing inverse multiplexer.

FIGS. 17A, 17B, and 17C schematically illustrate three possible configurations which are possible for each node FIGS. 18A–18D relate to the use and processing of control information according to an embodiment of the invention.

DETAILED DESCRIPTION OF THE PREFERRED EMBODIMENT

Figure 1:
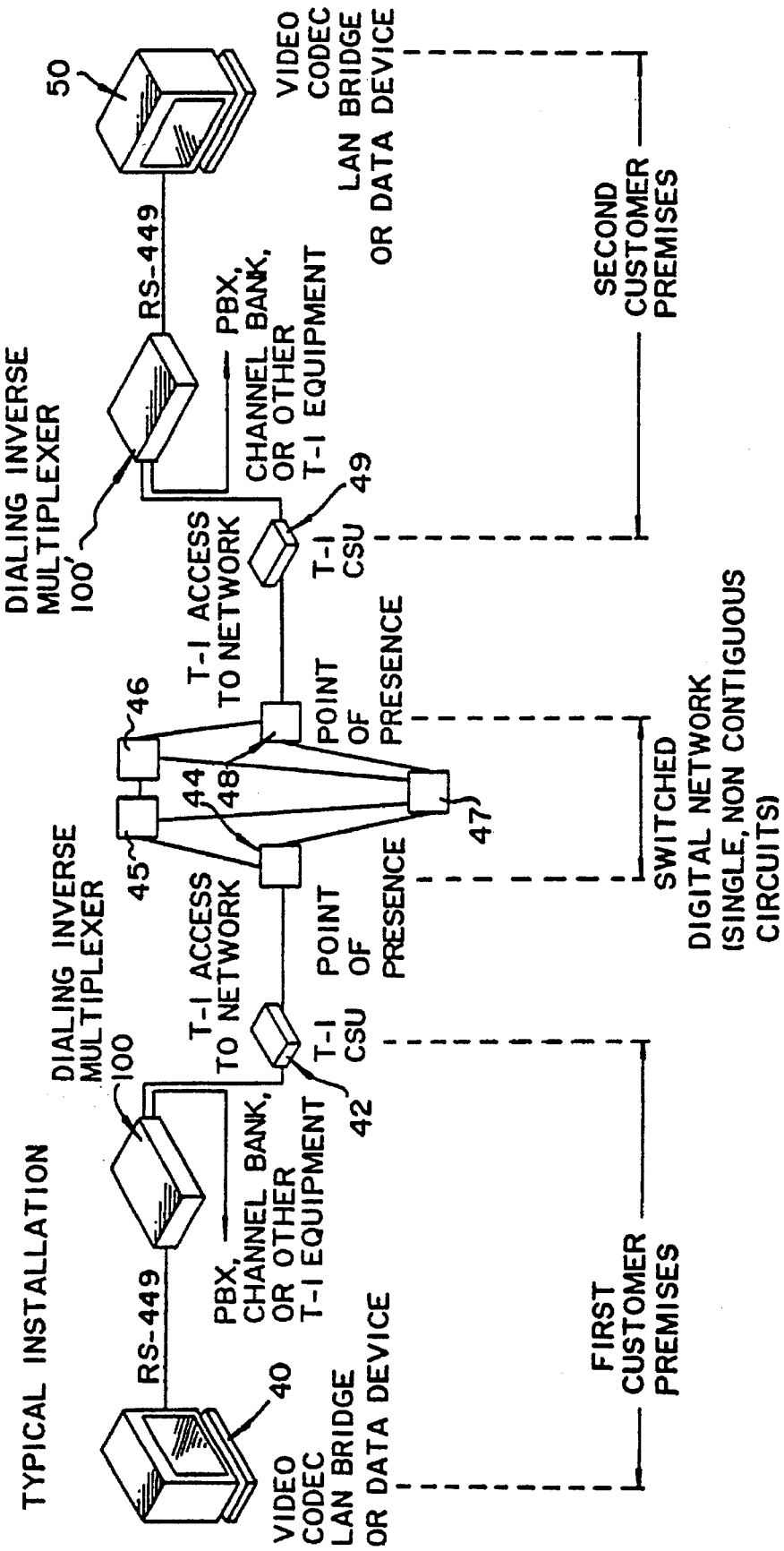
FIG. 1 schematically illustrates interconnection of components to a digital network, for providing digital communications between two different sites, according to the present invention.

A typical installation of a single dialing inverse multiplexer according to the present invention is depicted in FIG. 1, indicating a customer installation connected to a point of presence 44 on a switched 56 kbps/sec digital network. A T-1 channel service unit (CSU) 42 is connected to the point of presence 44 and is connected for communication with a dialing inverse multiplexer 100 according to the present invention. The dialing inverse multiplexer 100 can be connected to a variety of different devices, including a video CODEC 40, and can simultaneously be connected to a PBX, a channel bank, or other T-1 equipment. The video CODEC 40 can be replaced with a LAN bridge or other data device in the example of FIG. 1. The T-1 CSU 42 is a standard device. The CODEC 40 is also a standard device.

The network connections shown in FIG. 1 are schematic, and are representative of various connections which might occur among points 44, 45, 46, 47, and 48 when using a plurality of single, non-contiguous circuits. Points 44–48 indicate network switch sites; for example, 44=Wash D.C., 45=Chicago, 46= Denver, 47=Atlanta and 48=Los Angeles.

The point of presence 48 provides T-1 access to the network for a T-1 CSU 49 which is located at a second customer premises distant from the first customer premises. The network connections shown could include a variety of additional network paths, any of which may include a path including a satellite link. In the example arrangement of FIG. 1, a plurality of DS-0 channels are used to connect the first and second customer premises in order to provide a very high bandwidth transmission. Each of the DS-0 channels may be carried along a different network path, resulting in different times of reception at the point of presence 48.

At the second customer premises, the TS-1 CSU 49 is connected to another dialing inverse multiplexer 100' which in turn can be connected to a video CODEC 50. The video CODEC 50 can be replaced by a LAN bridge or other data device, and the dialing inverse multiplexer 100' can simultaneously be connected to a PBX, a channel bank, or other T-1 equipment. Furthermore, the dialing inverse multiplexers 100 and 100' can also be connected to other dialing inverse multiplexers of the same kind.

Figure 2:
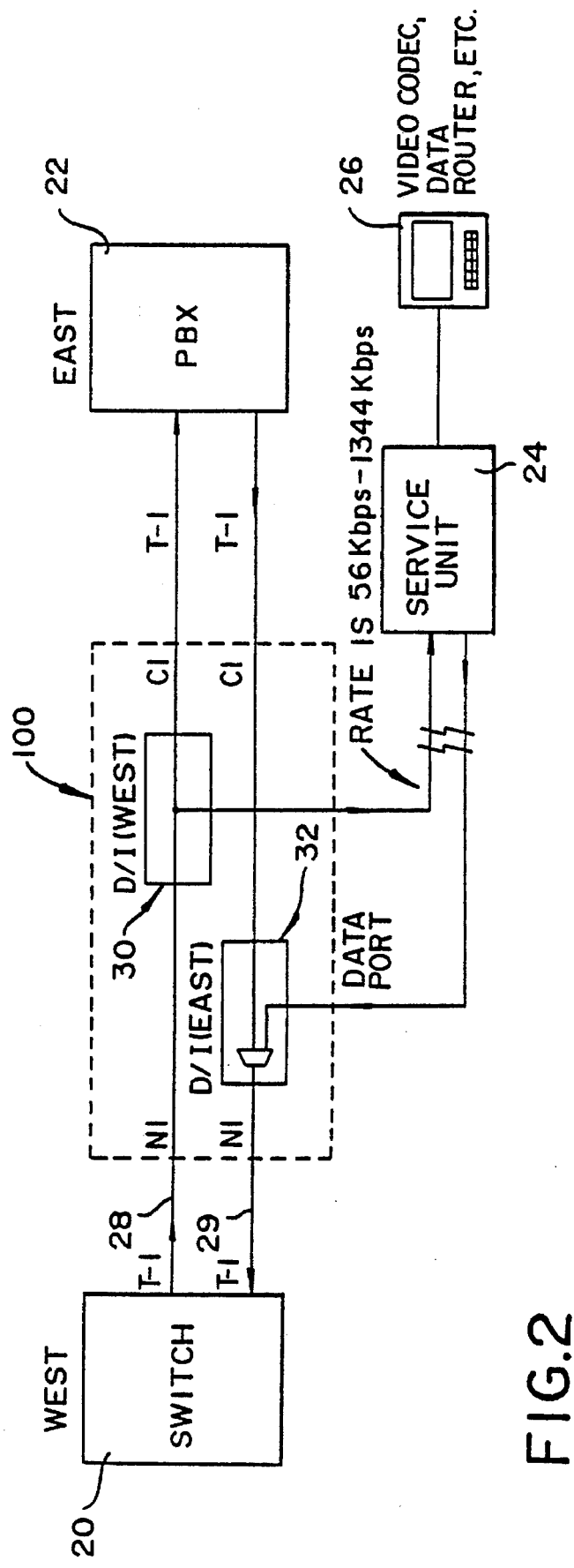
FIG. 2 is a functional block diagram of the connection of the above-noted commercially available dialing inverse multiplexer (which is also described and claimed in the aforementioned co-pending applications of which the present application is a continuation-in-part) with data input and output devices, and with a display device.

In FIG. 2, a "west" switch 20 is connected to an "east" PBX 22 via the dialing inverse multiplexer 100 (indicated in dotted outline). The dialing inverse multiplexer includes a D/I "west" branch element 30. The branch element 30 picks up a signal from line 28 and supplies the signal to an output device 26. The output device 26 can be a video display device, data router and so on. A D/I "east" branch element 32 selectively transmits a signal either from the PBX 22 or from the output device 26.

FIGS. 3A–3D illustrate for reference purposes the T-1 digital transmission standards. FIG. 3A shows a single channel containing 8 bits. FIG. 3B illustrates a frame containing 24 separate channels plus one frame bit used for synchronization purposes. Therefore, a frame is actually composed of 193 bits.

FIG. 3C illustrates a group of 24 frames, which together form a superframe. Each frame can be transmitted in 125 microseconds so that a superframe is transmitted in 3 milliseconds as shown in FIG. 3D.

Figure 4A:
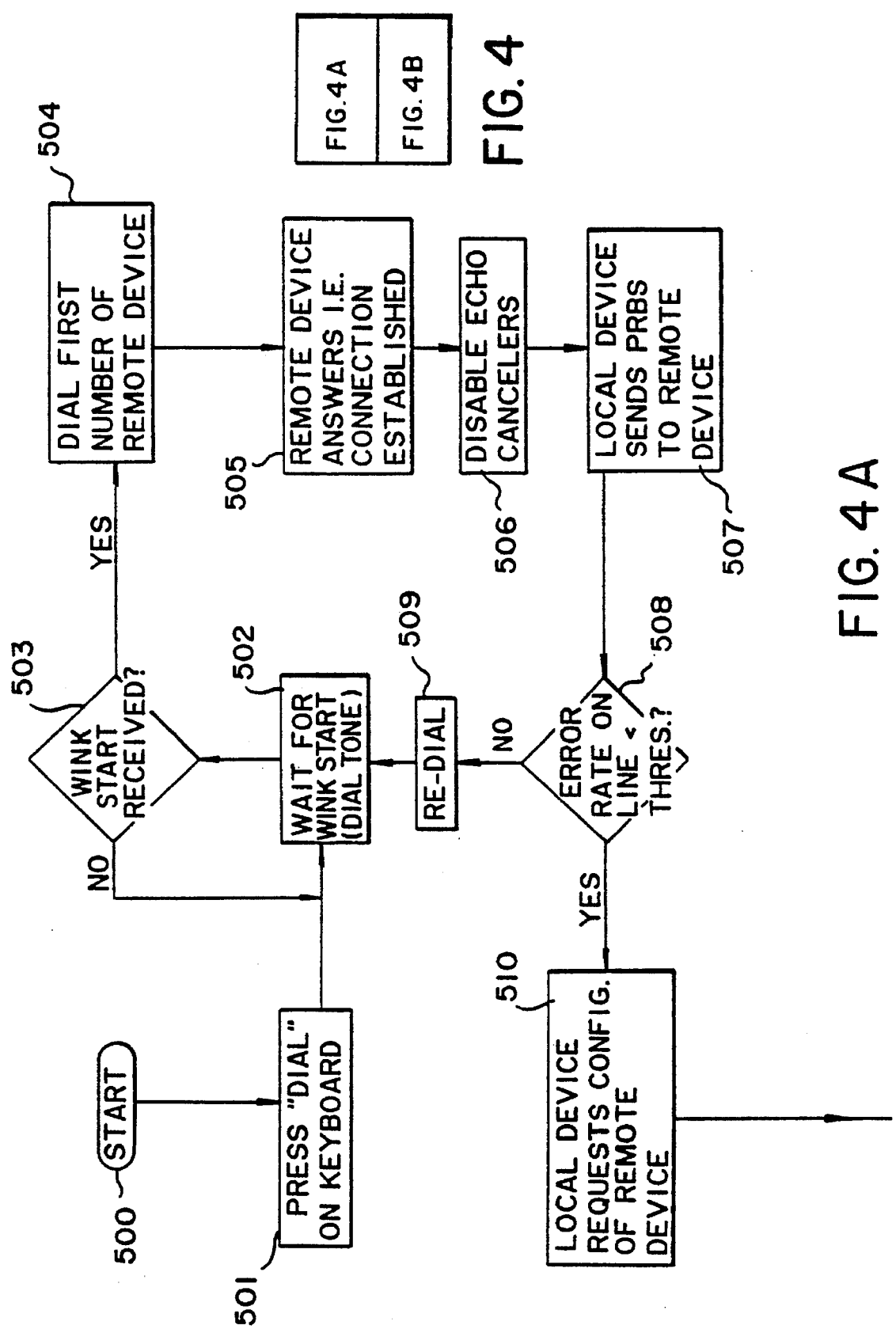
FIGS. 4(A)–(B) is a simplified flowchart depicting operation of the above-noted commercially available dialing inverse multiplexer.
Figure 4B:
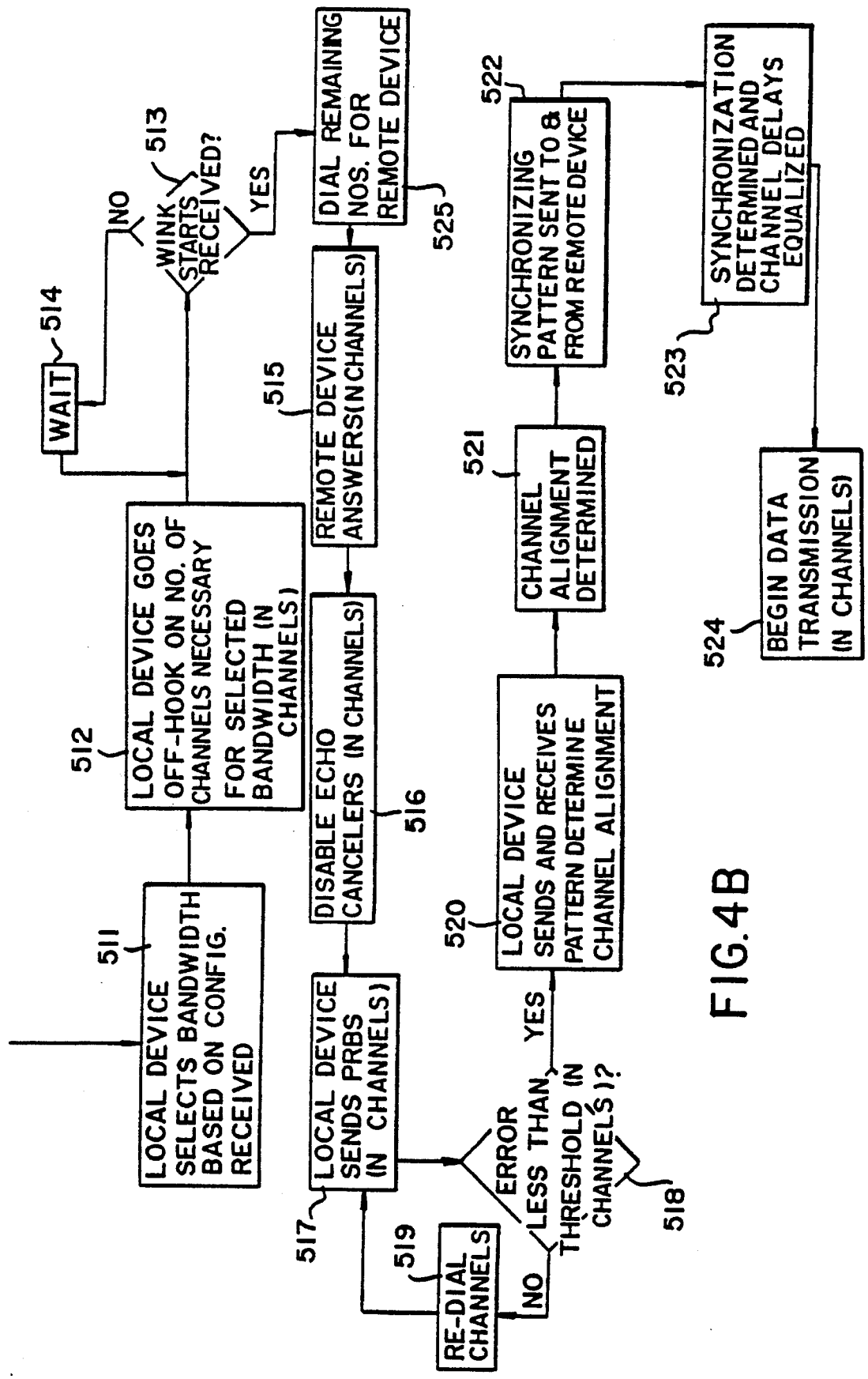

FIG. 4 is a flowchart (formed by FIGS. 4' and 4" which are portions of a single flowchart shown on separate sheets of drawing) depicting use of the dialing inverse multiplexers 100 and 100' for data communication, according to the present invention. To initiate data communication as indicated at block 500, the "DIAL" function is selected at block 501 from the unit keyboard. At block 502, the local dialing inverse multiplexer 100 goes "off-hook" and waits for a "wink" (i.e. dial tone) to occur, and as indicated at block 503, if the wink is received then the first telephone number of the remote dialing inverse multiplexer 100' is dialed as indicated at block 504. If the wink is not received, then the dialing inverse multiplexer 100 continues to wait until either a wink is received, or a preset time (e.g., 4 seconds) has expired.

As indicated at block 505, the remote dialing inverse multiplexer 100' answers and connection is established, after which a 2100 Hz tone is sent from the dialing inverse multiplexer 100 to disable the echo cancelers. The dialing inverse multiplexer 100 then sends a PRBS (pseudo-random bit sequence), which is used in a standard error rate test known in the communications industry, to the remote dialing inverse multiplexer 100', as indicated at block 507. The error rate on the line is then tested at block 508, and if below a predetermined threshold (e.g., 1 bit error per thousand bits), then as indicated at block 510, the dialing inverse multiplexer 100 requests configuration data for the remote dialing inverse multiplexer 100'. If the error rate is too high, i.e. is greater than the predetermined threshold value, then the dialing inverse multiplexer 100 goes on hook to disconnect the line, and re-dials as indicated at block 509. In that case, the sequence of events is repeated beginning at block 502.

After configuration data is requested at block 510, the dialing inverse multiplexer 100 selects a transmission bandwidth based upon the configuration of the remote dialing inverse multiplexer 100'. For example, if the local dialing inverse multiplexer 100 has a 16 channel capacity and the remote dialing inverse multiplexer 100' has only an 8 channel capacity, then the dialing inverse multiplexer 100 would select a bandwidth appropriate for the 8 channel capacity of the remote dialing inverse multiplexer 100', i.e. 8 channels. Then, as indicated at block 512, the local dialing inverse multiplexer 100 goes off-hook on the additional number of channels N necessary for the selected bandwidth.

In dialing the additional number of channels N necessary for the selected bandwidth, it is preferred that all of the N channels be dialed nearly simultaneously, to save on call setup time. This is in fact accomplished in the present embodiment.

In an alternative procedure, it would be possible to use N dialing devices all controlled to dial each of the telephone numbers received in the configuration data supplied from the remote dialing inverse multiplexer 100' (or which was prestored in the local dialing inverse multiplexer 100). Also, alternatively a special circuit arrangement could be designed for this purpose. All such network or loop setup methods are contemplated as being usable with the present invention.

For each of the N additional channels which go "off-hook" at block 512, it is determined at block 513 whether a wink start signal is received. If not, waiting occurs as indicated at block 514. If the winks are received, then each remaining one of the N additional numbers is dialed up as indicated at block 525. The remote dialing inverse multiplexer 100' then answers on each line as indicated at block 515. In practice, one or more channels of the remote dialing inverse multiplexer 100' may be busy or otherwise out of service, and in this event the local dialing inverse multiplexer 100 is preferably programmed to re-dial two more times to attempt to make a connection. The number of re-tries is arbitrarily selected, however, and any number of re-tries (or no re-tries) can be chosen.

As indicated at block 516, upon completion of connection of the channels, a 2100 Hz tone is sent from the local dialing inverse multiplexer 100 to cause echo cancelers to be disabled on each of the channels. The local dialing inverse multiplexer 100 then transmits the PRBS on each of the N channels (or the successfully connected lines if fewer than N channels are successfully connected), as indicated at block 517. If the error rate is less than a threshold, as indicated at block 518, then the local dialing inverse multiplexer 100 sends a pattern to the remote dialing inverse multiplexer 100' to determine channel alignment as indicated at block 520. Otherwise, the channel(s) having the unacceptable error rate is (are) re-dialed, as indicated at block 519.

After sending the channel alignment pattern at block 520, channel alignment is determined, as indicated at block 521. Then, a synchronizing pattern is sent from the local dialing inverse multiplexer 100 to the remote dialing inverse multiplexer 100' as indicated at block 522, after which synchronization and channel delays are determined as indicated at block 523. The synchronization is necessary to determine the relative time delays which occur among the connected lines, so that, taking into account the alignment data, the original data transmitted from the local dialing inverse multiplexer 100 to the remote dialing inverse multiplexer 100' can be reconstructed at the remote dialing inverse multiplexer 100'.

After synchronization has been determined at step 523, data transmission begins, as indicated at block 524, on all N channels simultaneously.

FIG. 5 is a detailed schematic diagram of elements forming the dialing inverse multiplexer 100. The dialing inverse multiplexer 100 includes element sub-groupings 101 and 102.

The sub-grouping 101 of the dialing inverse multiplexer 100 functionally includes LED driver circuit 100, RS-366 interface circuit 112, LCD display circuit 114, and keypad drivers circuit 116, all of which are connected to a central processing unit (CPU) 300. The CPU 300 can be operated consistently with the foregoing according to a program which would be within the ambit of one ordinarily skilled in the programming art, and communicates with a memory 801. The memory 801 can contain various types of stored information, for example lists of telephone numbers, and so on.

A T-1 receive/transmit interface 106 receives signals at a network interface (NI) receive line and transmits output signals to a network interface (NI) transmit line, as seen in FIG. 5. Similarly, a T-1 interface 104 outputs T-1 transmission signals from a customer interface (CI) element 106 and outputs these signals on a customer interface (CI) transmit line. The T-1 interface 104 receives T-1 signals on a customer interface (CI) receive line, and outputs these signals via a line 107 to a 16-port ADD ID matrix 140, an ADD data multiplexer 148, and a 6-pattern generator 230. A line 103 connects the interfaces 104 and 106 for receiving signals from the network interface receive line, and a clock generator 105 is connected to the line 103. The clock generator 105 supplies an output signal to a clock distributor 150, which is a 4-port clock distributor, and to a frequency synthesizer 310.

The clock distributor 150 receives an output signal from the frequency synthesizer 310, and supplies an output signal to an elastic store/DROP circuit 180 which has a 4-port structure. The output signal from the frequency synthesizer 310 is also supplied to an expansion connector 220.

The line 107 is connected to the "CI receive" output of the T-1 interface 104. The received signal is supplied by the line 107 to the 16-port ADD matrix 140, the ADD data multiplexer 148, and the 5-pattern generator 230.

A line 108 is connected to the line 103 for picking up a received signal from the T-1 interface 106, and this received signal is supplied by the line 108 to a 24-channel signalling capture element 240, a select channel data capture element 250, a serial-to-parallel converter 260, and a 16-port DROP ID matrix 142. The circuit portion 101 also includes a 4-port V.35 driver/receiver 120 having four input/output ports for data reception/transmission from/to the data device (e.g. CODEC). The driver/receiver 120 supplies an output signal to a loopback controller 190. The loopback controller 190 has an output signal which is supplied to an input of the driver/receiver 120.

In the circuit portion 102, a connector data port 210, which supports 16 data ports, supplies and receives signals to/from a 16-port V.35 device (not shown) and a V.25 bis device (not shown).

When signals are received from the CI receive line 107 by the interface element 104, an output signal is supplied along the line 107 to the ADD I/O matrix 140 which in turn supplies 16 output signals, one for each port, a 20-bit PRBS generator 146, the ADD data multiplexer 148, a 4-port elastic store/ADD circuit 170, and to the expansion connector 220. The PRBS generator 146 supplies an output signal to the ADD data multiplexer 148. The ADD data multiplexer 148 additionally receives the output signal from the 6-pattern generator 230, the output of the 4-port elastic store/ADD circuit 170, and an input from the expansion connector 220. The ADD data multiplexer 148 then produces a multiplexed output to the interface element 106 for transmission of the signal on the NI transmit line. The 6-pattern generator supplies its output signal to the multiplexer 148 and to the expansion connector 220.

The DROP I/O matrix 142 supplies 16 output signals, one for each port, to the 4-port elastic store/DROP circuit 180, the expansion connector 220, and PRBS receivers 160. The receivers 160 are both a 9-bit PRBS receiver and a 20-bit PRBS receiver.

The serial-to-parallel convertor 260 supplies its output signal to the delay equalization buffer 270. The buffer 270 is a 340-millisecond delay equalization buffer which stores received data on all channels and allows the synchronizer access to all data captured within the previous 340 milliseconds. The buffer 270 supplies its output signal to a synchronizer 280 which in turn supplies its output signal to a parallel-to-serial convertor 290. The parallel-to-serial convertor 290 supplies its output signal to the PRBS receivers 160, the elastic store/DROP circuit 180, and the expansion connector 220.

The clock distributor 150 supplies its output signal to the elastic store/ADD circuit 170 and to the elastic store/DROP circuit 180. The elastic store/DROP circuit 180 supplies its output signal to the loopback controller 190. The loopback controller 190 supplies one output signal to the elastic store/ADD circuit 170. The loopback controller 190 supplies another output signal to the V.25 bis insertion circuit 200. The V.25 bis insertion circuit 200 sends and receives signals to and from the connector data port 210. With regard to how the dialing inverse multiplexer dials, it does this through the ADD data multiplexer 148. The mechanism is that DTMF tones are digitally represented by repeating patterns, and can be switched into the T-1 data stream through this ADD data multiplexer 148. FIG. 5 shows the six pattern generator 230, which allows 6 different patterns to be enabled and selected into the channels of the T-1 telecommunications line.

The procedure for simultaneously dialing on all channels is for one of the patterns to represent all of the digits there required, and software then enables these patterns into the channel in the T-1 at specific intervals that represents the particular digit that needs to be dialed. That is, every 100 milliseconds the pattern will increment from the tones representing digit 0 to digit 1, to digit 2, and all the way to 9, and will then repeat. Then those digits are considered valid for a short period of time, for example about 50 milliseconds, then the software is used to decide which channels of the T-1 are to get which digit at a particular time, and software masks are set up so that idle time is enabled for the digits that are not needed. The digits that do need to go out on the channels are enabled at specific times and are not allowed to be transmitted at the other times.

FIG. 5 schematically shows the add ID matrix 140 and the drop ID matrix 142. The ID matrix concept is common to both the add side and the drop side, the add side being data transmitted to the T-1 telecommunications line and the drop side being data taken from the network T-1 telecommunications line.

Figure 6:
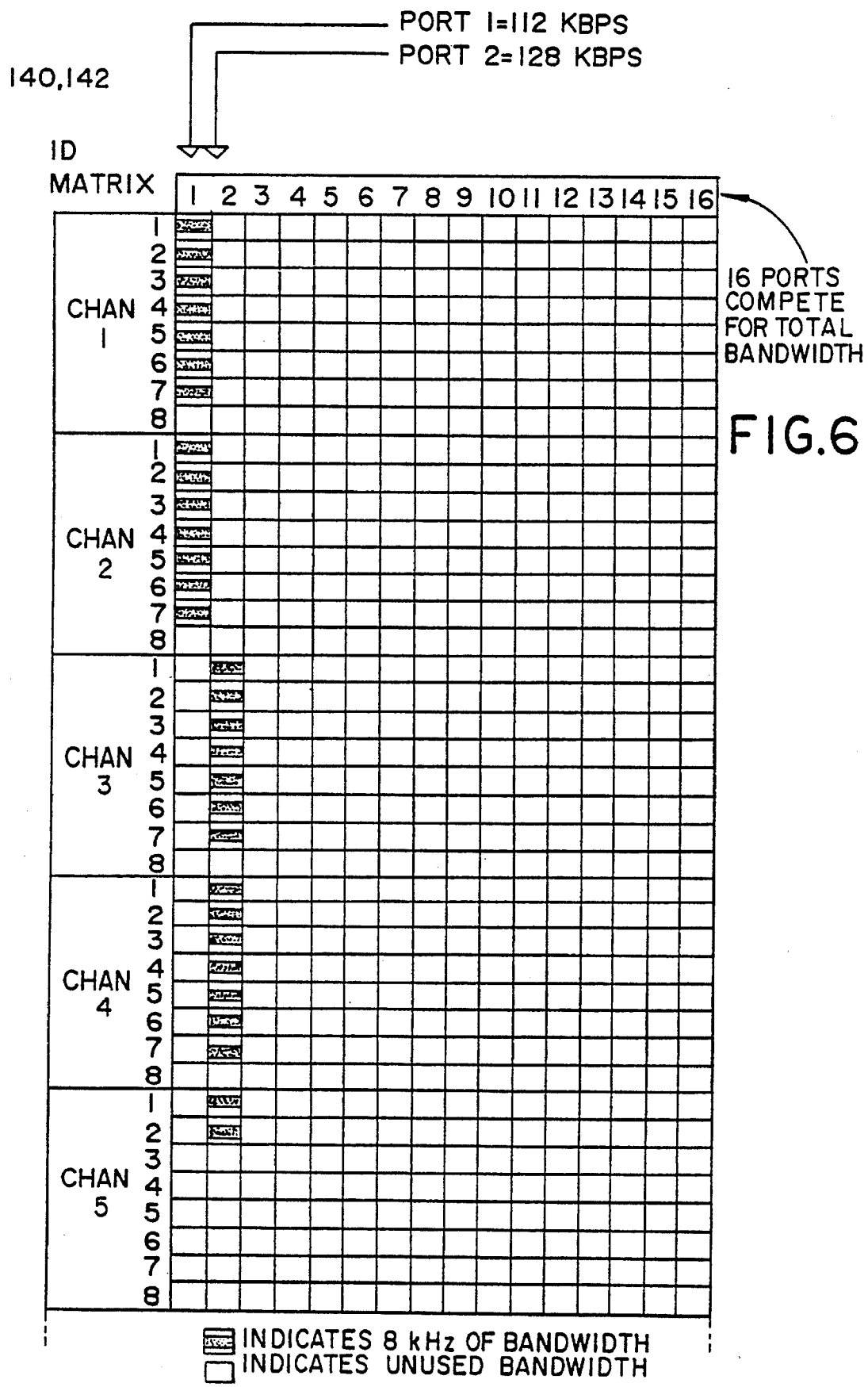
FIG. 6 schematically illustrates port and channel connections to the ADD and DROP matrixes of FIG. 5, depicting examples of channel usage according to the commercially available dialing inverse multiplexer.

In FIG. 6, an ID matrix is shown corresponding to either one of the matrices 140 and 142. The top row lists column headings for 16 ports, numbered 1 through 16 consecutively, while the left column represents channels 1 through 24 (only channels 1 through 5 are shown enabled), each channel having bits numbered 1 through 8. Examples of different bandwidths on different channels being supplied through ports 1 and 2 are depicted in FIG. 6. During actual operation, only non-overlapping ones (i.e., having non-overlapping channels) of the above-noted ports would be in use.

FIG. 6 shows the channels numbered 1 through 24 along the left side of the drawing, and is for the standard D4 framing. This framing scheme can apply for standard D4 framing or can be adapted for other framing schemes. Horizontally across the top of FIG. 6 are the numbers 1 through 16 representing the number of ports available on the dialing inverse multiplexer 100. The number of ports selected is arbitrary, and could be extended to an arbitrarily large number indefinitely.

The ports in FIG. 6 are shown as being sixteen in number, the ports being numbered consecutively as port numbers 1 through 16. Shown in this figure, blocked off for port 1 are 7 out of 8 bits of channels 1 and 2. Each block bit represents 8 kilobits of data. The first seven bits of channel 1 represents 56 kilobits of data, and the first 7 bits of channel 2 represents another 56 kilobits of data. These arrangements are set up by the software in this matrix format (as described further below) so that, depending on the user's bandwidth needs, the user can establish a connection with n times 8 kilobits of data capacity to the network. For port 2 in FIG. 6, there are enough bits "enabled" on port 2 as shown, to support 128 kilobits of data. This would require dialing up three channels and using only part of the bandwidth of the third channel, as shown in FIG. 6, at port 2. In "this example, only two of the seven 8-kilobit data slots in Channel 5 are required for the desired user bandwidth. The other five data slots in Channel 5 would be "padded" with ones just to maintain the well-known "ones density" requirement. The specific configuration shown in FIG. 6 is arbitrary, and depends on the selected bandwidth, port selected, and so on.

The remaining 14 ports in the example of FIG. 6 would, in this example, not be used for data transport. Some of the ports could be enabled in parallel on the drop side, that is, data coming from one distant source can be "dropped" to (received at) multiple ports at the receiving dialing inverse multiplexer. If two different ports are to be used to receive the same information, then the block bits of the channels on the DROP ID matrix would be enabled for both ports. For example, if port 5 was required to receive the same data as port 1, then software would block in port 5 the first 7 bits in channel 1 and the first 7 bits in channel 2, and then port 5 would be receiving the same data as port 1. This represents a very flexible architecture for performing addition and dropping of 8 kilobit bandwidth to and from a network which might be formed by a plurality of dialing inverse multiplexers communicating with each other in a network formation.

Each of the ports in the example shown in FIG. 6 carries different data rates. The dialing inverse multiplexer 100 according to the present invention, using the ADD matrix 140 and the DROP matrix 142, enables selection of the number of channels to be used, the particular channels to be used, and even permits selection of the number of bits in a channel for fractional channel usage, all depending upon the required data rate. For example, in FIG. 6, port i carries data at a rate of 112 kbps on channels 1 and 2, whereas port 2 carries information at a rate of 128 kbps and uses channels 3, 4 and of ¼ of channel 5. The ability to use fractional portions of individual channels is discussed further in the following.

Each port in FIG. 6 have control over the entire T-1 bandwidth. While 16 ports are shown, any number of ports could be designed in. For example, only four ports could be used, and alternatively, more than sixteen ports could also be provided. The bandwidth can be shared with different ports on the DROP side, although not on the ADD side. That is, the bandwidth can be shared with different ports when using the DROP ID matrix 142 but not when using the ADD ID matrix 140.

Figure 7:
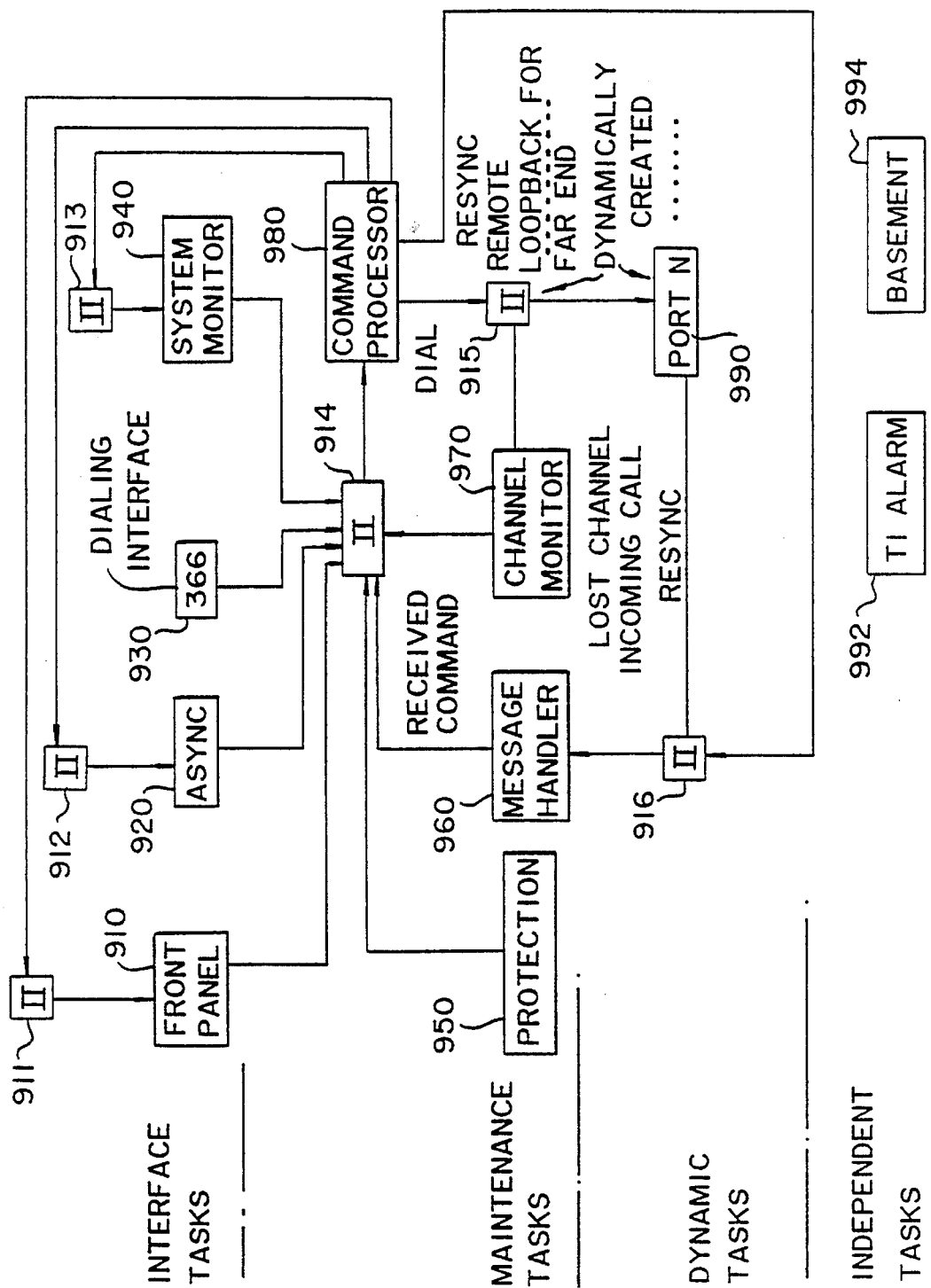
FIG. 7 schematically illustrates a software architecture used in the commercially available dialing inverse multiplexer according to the present invention.

FIG. 7 is a schematic diagram depicting the 4-port clock distributor 150 of FIG. 5. This figure shows four ports implemented, in which each of the clock selectors represented by blocks 155, 156, 157, and 158, are multiplexers, one for each of Ports 1–4, and are identical. The clock selectors 155–158 respectively supply output signals labelled as Port 1 clock, Port 2 clock, Port 3 clock, and Port 4 clock.

The concept of dial-up bridging using a plurality of the dialing inverse multiplexers 100 in a network loop relies on the ability of each dialing inverse multiplexer 100 to dial-up multiple channels to each of two neighbors on a loop. A minimum of two circuits for each dialing inverse multiplexer 100 allows for a loop configuration.

In order to maintain two (or more) circuits using the dialing inverse multiplexer 100, each of the circuits having multiple channels connected to other dialing inverse multiplexers, a multitasking software architecture is incorporated as shown in FIG. 7. The general overview of this architecture is as follows.

The main tasks performed by the multitasking software architecture are shown as labeled boxes, while the boxes containing the numeral II employ a standard convention denoting queues. Queues are mechanisms by which the various tasks communicate or synchronize with each other. The tasks are shown as being divided into four groups: interface tasks, maintenance tasks, dynamic tasks, and independent tasks. These are discussed further, as follows. The command processor labeled 980 basically takes commands from the queue, processes them, and then if there is any response that the originator of the commands is waiting for, it sends the response back to the interface task that it originated from. For example, if someone presses a button on the front panel to request the dialing directory, the command will come into the queue 914 and the command processor 980 pulls it out of the queue and performs the command, generates a response, sends it back to the front panel through its queue. If the command processor 980 happened to be busy doing something else, the command would remain in the queue until the command processor 980 is ready.

With regard to multitasking software, basically it is a number of different small program tasks that operate semi-independently but at the same time can communicate with other tasks. As a whole, the set of tasks can perform an overall function, but each one is fairly independent.

The interface tasks each control different interfaces to the command processor 980. These include the front panel task 910 which manages input/output through the front panel display and keypad, the async task 920 which handles input/output through the asynchronous port, and the RS-366 dialing interface task 930 which manages the RS-366 dialing interface. Also included is the system monitor task 940 which is primarily to be used as a system debugger. The front panel task 910 receives instructions from the command processor task 980 via a queue 911. The async task 920 receives instructions from the command processor task 980 via a queue 912. The system monitor task 940 receives instructions from the command processor task 980 via a queue 913.

The maintenance tasks handle the majority of the processing needed to control the major functions of the dialing inverse multiplexer 100. The command processor task 980 accepts command requests via a queue 914 from a variety of interface sources. It performs the actual steps needed to execute the command received.

The channel monitor task 970 monitors the signalling bits in the T-1 bit stream and handles incoming calls, as well as redialing channels that are dropped during a call. The message handler task 960 manages internodal communication between the dialing inverse multiplexers and allows a given dialing inverse multiplexer at one node to send a command to another dialing inverse multiplexer to be executed remotely at that node. Finally, the protection task 950 monitors the chosen protection scheme for a circuit, and resynchronizes or redials a circuit in case of data corruption (due to a frame slip, for example).

The protection task 950 is very general. It monitors channels for invalid data. A frame slip is the most severe example of a fault. If a frame slip occurs when a call is already established, there are a certain number of channels that are connected to another dialing inverse multiplexer, and since each channel takes a different path, synchronization and alignment are in existence. If a frame slip occurs, meaning the T-1 has increased or decreased in speed, synchronization would be lost. At that point, it would be necessary to resynchronize. That is the main function of the protection task 950, i.e. to resynchronize a circuit in event of a frame slip. This can be implemented in any of several ways, one being to periodically sample a block of data on each channel. If bad parity is detected, resynchronization can then be performed.

One scheme for resynchronization involves sending pseudo-random data on a separate 8 kilohertz channel, or alternatively using a separate channel altogether and then monitoring that at the other end. All such resynchronization methods are contemplated as being usable with the present invention.

Queue 915 receives output signals from the command processor task 980 to dial, and receives output signals from the channel monitor task 970 to indicate a lost channel or an incoming call.

Dynamic tasks are ones that are created and destroyed as needed. The port N task(s) 990 are created upon dialing a new circuit or receiving an incoming call. Up to four such tasks may exist, in the preferred embodiment. They each handle the dialing and answering functions required for each circuit. When the circuit is disconnected, the corresponding port N task 990 is deleted. The port n task 990 outputs resync instructions to a queue 916.

Independent tasks don't need inter-task communication but rather operate asynchronously to other tasks. These include the T-1 alarms task 992 which handles network alarms, and the basement task 994 which performs miscellaneous system checks at a very low priority level. The basement 994 task is a task that is basically the lowest priority (hence the name basement). When no other tasks are running, the basement task is running. Such tasks might include system checks.

The multitasking architecture shown schematically in FIG. 7 allows the dialing inverse multiplexer 100 the capability to manage multiple ports or users simultaneously.

Figure 8:
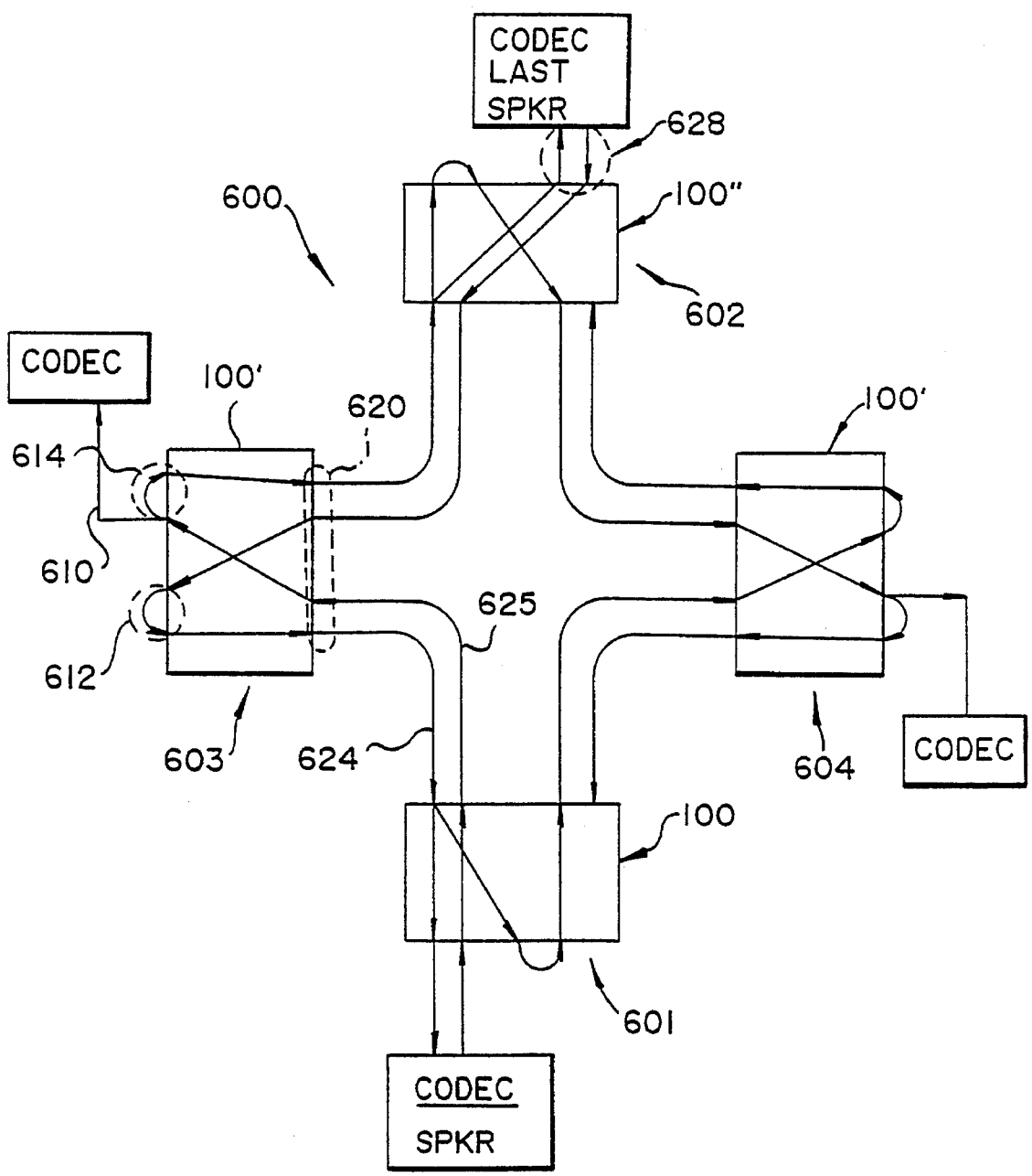
FIG. 8 schematically illustrates a dial-up bridge network formed according to one embodiment of the present invention.

FIG. 8 illustrates one embodiment of a full-duplex dial-up video bridging arrangement having four nodes. To begin one active session, a user can form the dial-up video bridging arrangement shown in FIG. 8 by selecting certain users from a stored dialing directory (contained in memory, for example, in the dialing inverse multiplexer), and then give the command to dial these numbers. The nodes can be arranged in an arbitrary order to form a dial-up network or loop 600 as shown in FIG. 8, although the order of the nodes along the loop remains completely transparent to the user.

In one dialing procedure usable by the dialing inverse multiplexer 100, a list of numbers is selected. This list can be contained in the memory 801 of the dialing inverse multiplexer 100. The first node (which is another dialing inverse multiplexer at a different location from the sender) in the dialing list is dialed by the sender, and the sending dialing inverse multiplexer 100 then passes the list of numbers to the target dialing inverse multiplexer at the first node. The first node, having received the list of numbers, then dials the next dialing inverse multiplexer in the list, and so on. The last node in the list is the originating dialing inverse multiplexer 100, and this completes the loop.

Another procedure for establishing the dial-up network shown in FIG. 8 requires the first node to dial all other nodes simultaneously. Each of the dialed nodes is then instructed to dial its downstream neighbor. This results in a parallel dialing scheme which is significantly faster than the above, serial dialing scheme.

In FIG. 8, once the dial-up bridge or loop 600 has been established, a starting node 601 is considered the beginning speaker and therefore has video control. The node 601 injects its video (and audio) signal around the loop 600 (in the clockwise direction of the loop as view in FIG. 8). All of the other participants at each of the nodes 602, 603, and 604 see the speaker, while participants at the speaker node 601 see the last (chronologically previous) speaker at the node 602. This is accomplished by sending the speaker's image around the loop "clockwise" while the image of the last speaker is sent "counter-clockwise" as viewed in FIG. 8. These loop directions are arbitrary, however, and these directions could be reversed.

At each node which is not the current or last speaker, e.g. nodes 603 and 604 in FIG. 8, the data must be passed through both clockwise and counter-clockwise about the loop 600. At the same time, the "clockwise" signal received at each of the nodes 603 and 604 must be sent to the respective CODECs 611 and 621 for display of the video signal at those nodes (not shown in the drawings). As seen in FIG. 8, a port 610 carries the video (and audio) signal from the dialing inverse multiplexer 100' to the CODEC 611. The signal at the port 610 is also retransmitted as indicated schematically by a loop 614 in FIG. 8, however no additional port is needed at this location since the retransmission is performed by the loopback controller 190 shown in FIG. 5 under software control.

Similarly, the signal at the loop 612 is also retransmitted as indicated schematically by a loop in FIG. 8. The retransmission is likewise performed by the loopback controller 190 shown in FIG. 5 under software control.

A single port 628 connects the "last speaker" dialing inverse multiplexer 100" to the CODEC. As can be seen in FIG. 8, a single port carries full duplex (i.e., two-way) signals, as indicated by the two oppositely directed arrows indicated at 628. A T-1 or E-1 connection is illustrated at 620, where the two loops enter and leave the dialing inverse multiplexer.

The data received from the clockwise loop is distributed among one to twelve channels, in the case of T-1. It is retransmitted in the clockwise direction on one to twelve other channels. Any channels used to receive from the clockwise loop will also be used to transmit to the counter-clockwise loop. Channels used to transmit to the clockwise loop will receive from the counterclockwise loop. This allows full utilization of up to 24 channels in each direction.

The paths shown in the dialing inverse multiplexers 100, 100', and 100" schematically indicate the data flow therethrough. As seen in FIG. 8, a different internal data configuration is required for the speaker node 601, and yet another internal data configuration for the node 602 of the last speaker.

These different internal data configurations must be switched as the speaker changes nodes, i.e. when a new speaker follows, the speaker at node 601 then becomes the "last speaker" rather than the "current" speaker. A new dynamic task must be implemented in this dial-up bridging mode by the multi-tasking software to reconfigure these switched internal data configuration modes. This task is also responsible for determining which node receives the authority to be the speaker (by conferring with other nodes) when multiple nodes request control. This involves monitoring the push-to-talk device interface or other appropriate control mechanisms, discussed later.

Since the speaker signal and also the last speaker signal completely traverse the loop 600 and return to the original node, all nodes other than the speaker or last speaker pass the last speaker signal on and loop back while at the same time taking the speaker signal and sending it out the data port to the CODEC and passing it on. Basically both signals are passing through the dialing inverse multiplexer 100, 100', or 100", with the dialing inverse multiplexer picking off the speaker's signal and sending it to the CODEC. In terms of the signals that are passed around the loop, those dialing inverse multiplexers which are neither the speaker nor the last speaker basically don't change any data. Received data passes right on through the corresponding dialing inverse multiplexer, which monitors the speaker signal (i.e., the signal from the current speaker's node) so that the current speaker can be seen. In this manner, it is possible to have as many nodes in the entire loop as desired, all but two of them being in the "observer" configuration, and the two special ones being in the "speaker" configuration and in the "last speaker" configuration. Those two have slightly different internal configurations, so that they can perform their respective functions.

When the speaker changes, the dialing inverse multiplexers must switch internal configurations (e.g., internal maps), such that there is a new speaker. Therefore, the dialing inverse multiplexer that was the speaker now has to become the last speaker. The dialing inverse multiplexer that is the new speaker has to convert from whatever it was to now being a speaker and the node that was the last speaker becomes a completely transparent node assuming it is not speaking again.

The dialing inverse multiplexer is able to perform the foregoing bridging by use of the ID matrixes 140 and 142, which as shown in FIG. 5 allow the data to be respectively added or dropped to any data port from any channel. Basically, these matrixes 140 and 142 are a way of dynamically assigning the ports to the channels. The software has access to these matrixes and can set them accordingly, allowing the dialing inverse multiplexer 100 to dynamically select a drop-and-insert or drop-and-pass function at each node and for each loop. Normally, in a multiport dialing inverse multiplexer, the data from each port would be independent of the data from another port, but to enable bridging the parts are connected together to form a loop configuration. The different configurations are the speaker, the last speaker, or any of the other, observer nodes. The configuration can be simply altered by changing the mapping between the ports and the channels, which is exactly what the ID matrixes 140 and 142 do.

In FIG. 6, the channels are on the left and the ports are represented across the page to 16 ports. The data from one channel can actually be dropped on two different ports, for example, on channel 1, the data can be dropped on both port 1 and port 2, and in FIG. 8 the speaker node 601 first passes received data from node 603 to two different ports, then passes it on to the next node by simply looping the second port. When the speaker changes, the conferencing software effects the necessary switching by resetting matrices 140 and 142 as well as the loopback controller.

For the case where the multiport dialing inverse multiplexer 100 has four ports, there will be two extra ports beyond that needed to form a loop 600, and these two additional ports can be used independently of the group.

The intelligence that the dialing inverse multiplexer 100 uses to know when to switch and communicate with each other about which dialing inverse multiplexers are switching modes, is done by the conferencing software. In the preferred embodiment, switching is signalled by a message passing capability wherein the message to switch is actually superimposed upon the data stream so as to be carried thereby. Alternatively, switching signals can be transmitted to nodes of the loop 600 by use of a separate channel. This requires use of additional bandwidth that would otherwise be available for data transmission, but has the advantage this it does not disturb the data stream. Each node can thereby communicate with the other nodes to pass information on the current speaker location, last speaker location, or whatever other information needs to be passed.

The dialing inverse multiplexer 100 has a fundamental message carrying capability for in-band message carrying, as follows. It basically pertains to an inband messaging scheme which the current dialing inverse multiplexer performs to do a number of functions. Whenever a call is established many commands are passed from one dialing inverse multiplexer to another to perform synchronization, alignment, and BER testing. After a call is established, the messages that are passed from one dialing inverse multiplexer to another only occur under certain situations. For example, if one dialing inverse multiplexer 100 requires the attention of another dialing inverse multiplexer 100' (for example a resynchronization command) it would send a specific inband message to the other dialing inverse multiplexer 100' in place of the data normally transmitted. The other dialing inverse multiplexer 100' would receive this command and respond accordingly and perform the command. With inband messaging, bandwidth is being used that would normally be used for user data. In this case, "crashing" of some of the user data actually occurs for a brief period of time. With some applications, lost data may be unacceptable. In other applications, it may be perfectly acceptable, e.g. in video conferencing, generally it is very acceptable, and the message data, protected by CRC, would not normally affect the video output. In other applications not pertaining to bridging or video conferencing, every data bit may be very valuable to the user and inband messages should be avoided if at all possible after the call is established. This fundamental message passing capability is in the dialing inverse multiplexer 100.

Figure 9:
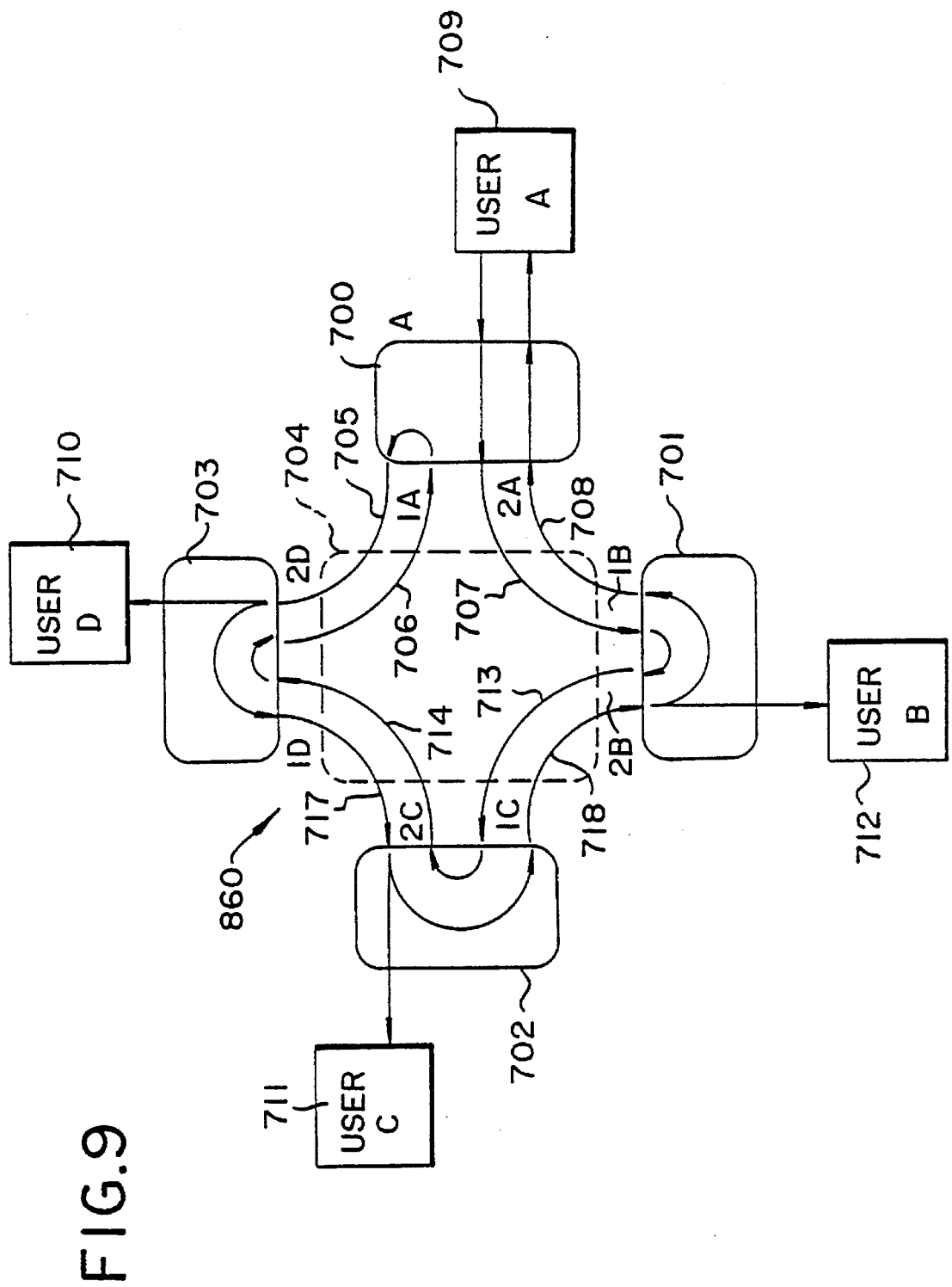
FIG. 9 schematically illustrates a dial-up bridge network formed according to another embodiment of the present invention.

FIG. 9 illustrates the simplest embodiment of the present invention, taking the form of a half-duplex dial-up video bridging arrangement having four nodes. The term "half-duplex" is used here to indicate that the program material, or customer data, passes through the loop in only one direction at a time. In FIG. 9, the SPEAKER data originates at the USER A 709, then passes clockwise through the other three nodes and back to USER A. There is only one "program" passing through the loop. This is distinguished from the scheme of FIGS. 8 and 21, which both have programs going simultaneously in the clockwise and counterclockwise directions, and which will be referred to as "full-duplex" in the remainder of this discussion. The half-duplex arrangement has an advantage in that it can be realized with only one drop point and one insertion point per node, while the full duplex scheme requires two drop points and two insertion points per node (one drop and one insert in each direction at each node). Thus the half-duplex system is cheaper to implement and simpler to manage. Another potential advantage is that, since the data makes two passes through all nodes (one path going and one path returning), theoretically at least, either path could carry all of the traffic. Thus, we have a "spare" path which could be used for backup purposes, assuming that the switch matrices at each node were configured to make this possible by permitting connection of the user to either path 1A or 2A. This feature would be most useful is microwave or satellite circuits were involved, in which case there is greater possibility for disruption of one direction of a two-way circuit. The disadvantage of the half-duplex circuit is that it does not allow the SPEAKER to view any other parties while speaking.

To begin an active session, a user can form the dial-up video bridging arrangement shown in FIG. 9 by selecting certain users from a stored dialing directory (contained in memory, for example, in the dialing inverse multiplexer), and then give the command to dial these numbers. The nodes can be arranged in an arbitrary order to form a dial-up network or loop 860 as shown in FIG. 9, although the order of the nodes along the loop remains completely transparent to the user.

As shown in FIG. 9, dialing inverse multiplexers 700, 701, 702, and 703 are located at different user sites which typically would be located in different cities. Users 709, 710, 711, and 712, respectively designated as users A, B, C, and D, are respectively connected to the dialing inverse multiplexers 700, 703, 702, and 701.

In FIG. 9, once the dial-up bridge or loop 860 has been established, a starting node A is considered the beginning speaker and therefore has video control. The node A injects its video (and audio) signal around the loop 860 (in the clockwise direction of the loop as viewed in FIG. 9). All of the other participants at each of the nodes B, C, and D see the speaker. This is accomplished by sending the speaker's image around the loop "clockwise" and then back. These loop directions are arbitrary, however, and these directions could be reversed.

At each node which is not the current speaker, e.g. nodes B, C, and D in FIG. 9, the data must be passed through both clockwise and counter-clockwise about the loop 860. At the same time, the "clockwise" signal received at each of the nodes B, C, and D must be sent to their respective user devices 709–712 (e.g., video CODEC devices). As seen in FIG. 9, a port 2A is used to carry the video (and audio) signal to/from the dialing inverse multiplexer 700. The signal at the port 2A is also retransmitted as indicated schematically along the loop 860.

In FIG. 9, the following applies. The loop 860 shown includes nodes (or users) A, B, C, and D, in which all of the nodes are qualified to receive (via the loop 860) the transmission of any node. Unless a node is transmitting, it passes all received data back to the loop 860. Locally transmitted data which has been around the loop 860 once is not returned to the loop 860.

The node which has SPEAKER status transmits. Retention of SPEAKER status is determined by arbitration of transmission requests between the nodes. Arbitration is preferably accomplished out-of-band over a separate channel from the program material. The channel is separated either (a) space-wise, using a separate control channel; (b) space-wise, using verbal agreement between conferees, established over a separate (but integrated) audio conference loop; or (c) time-wise.

Upon completion of each transmission, and prior to change of transmission from one node to the next, control information is circulated to all nodes, including a list of queued-up transmission requests, and not more than one associated authorization.

Transmission requests can be initiated by a push-to-talk signal at each node. In this case, the signal is the logical OR of requests from each person participating in the conference at a given node. The method of OR'ing may be as simple as a centrally located button.

Transmission requests can be initiated by a voice-activated control at each node. This will require that the parties respond when spoken to, and remain relatively quiet otherwise.

The transmission requests may or may not be reorganized in a priority other than first-come-first served, by presenting a display of the outstanding requests to a moderator. The moderator could select from the display which party is to be allowed to transmit next. This could be accomplished by adding an authorization signal to the request signals circulating on the loop.

The message packet format (for arbitration form "c" above) is preferably as follows:

BOT/CONTROL/PROGRAM/EOT where:

BOT is a code sequence signifying beginning of transmission;

CONTROL includes:

THIS STATION ID/REQUESTS/AUTHORIZATION

THIS STATION ID—self explanatory

REQUESTS—a list of stations requesting transmission

AUTHORIZATION—the authorized station. Either the oldest request, or the moderator's choice.

PROGRAM includes whatever data is to be transmitted. This could be the synchronous output of a video CODEC or of a computer, for example. In the case of a computer, the "conference" would take place between computers in a global storage area which is maintained identically at all locations.

EOT is a code sequence signifying end of transmission.

Since the speaker signal completely traverses the loop 860 and returns to the original node, all nodes other than the speaker pass both ways around the loop while at the same time taking the speaker signal and sending it out the data port to the user. In terms of the signals that are circulated around the loop, those dialing inverse multiplexers which are not the speaker do not change data or pass on any new data. The data passes through to the next dialing inverse multiplexer on the loop 860, while receiving the speaker signal (i.e., the signal from the current speaker's node) so that the current speaker can be seen. In this manner, it is possible to have as many nodes in the entire loop as desired.

A public switched telephone network 704 is the interconnection medium for connecting the dialing inverse multiplexers 700, 701, 702, and 703. With regard to the dialing inverse multiplexer 700 for the user A, paths 705 and 706 represent the send and receive paths for one DS0 channel 1A contained within a 24-channel T-1 connection to the public switched telephone network 704. Paths 707 and 708 represent the send and receive paths for a second DS0 channel 2A on the same 24-channel T-1 connection as the first DS0 channel 1A. Likewise, with regard to the dialing inverse multiplexer 701 for the user B, paths 708 and 707 respectively represent the send and receive paths for one DS0 channel 1B contained within the 24-channel T-1 connection to the public switched telephone network 704. The paths 707 and 708 also respectively represent the send and receive paths for one DS0 channel 2A of the dialing inverse multiplexer 700. Similarly, paths 713 and 718 represent the send and receive paths for a second DS0 channel 2B of the dialing inverse multiplexer 701.

Likewise, with regard to the dialing inverse multiplexer 702, corresponding to user C, paths 718 and 713 respectively represent the send and receive paths for one DS0 channel 1C contained within a 24-channel T-1 connection to the public switched telephone network 704. Paths 714 and 717 represent the send and receive paths for a second DS0 channel 2C on the same 24-channel T-1 connection as the first DS0 channel 1C.

Similarly, with regard to the dialing inverse multiplexer 703, corresponding to the user D, the paths 717 and 714 respectively represent the send and receive paths for one DS0 channel 1D contained within a 24-channel T-1 connection to the public switched telephone network 704. The paths 706 and 705 represent the send and receive paths for a second DS0 channel 2D on the same 24-channel T-1 connection as the first DS0 channel 1D.

The public switched telephone network 704 includes the respective four local telephone company offices (not shown separately) which directly connect to the dialing inverse multiplexers 700 through 703, as well as the entire telephone company interoffice switching network (also not shown separately). This simplification permits the schematic depiction in FIG. 9 to more clearly show the signal flow between and within the dialing inverse multiplexers 700–703. The users A, B, C, and D, indicated respectively by elements 709, 712, 711, and 710, may be any type of data terminal device such as a video CODEC, including high speed data terminal devices.

In one arrangement, shown in FIG. 9, the users A–D are video CODECs, and are connected so as to constitute a network of video CODECs in a conference bridge arrangement. In the following discussion, the term "speaking" is used to indicate that a specific one of the dialing inverse multiplexers is "transmitting", that is, whose signal is carried sequentially to each of the dialing inverse multiplexers in the above-described network. FIG. 9 depicts the user A, indicated by element 709, as the "speaking" one of the dialing inverse multiplexers shown, with the signal of user A (corresponding to element 709) passing in a loop 860 through dialing inverse multiplexers 700, 701, 702, and 703 via paths (on the above-described DS0 channels) 707, 713, 714, 706, 705, 717, 718, and 708 in sequence.

In the above-described arrangement shown in FIG. 9, the user A at element 709, referred to also hereafter as the SPEAKER 709, would see a delayed image of himself or herself, after the transmitted image has completely circulated around the above-described loop 860. While this reception by the SPEAKER 709 of its own data may not be desirable for videoconferencing applications, it would be desirable for certain computer networking applications, since the transmitting user (e.g., user A in FIG. 9) would be able to verify the received copy of its own data after the data had traversed the loop 860, thereby ensuring that the correct data had arrived at all locations. The other users B, C, and D (corresponding to elements 710, 711, and 712 in FIG. 9) would only monitor (i.e., receive) user A's data, and would be permitted to transmit only when 709 had signalled completion of transmission.

Figure 10:
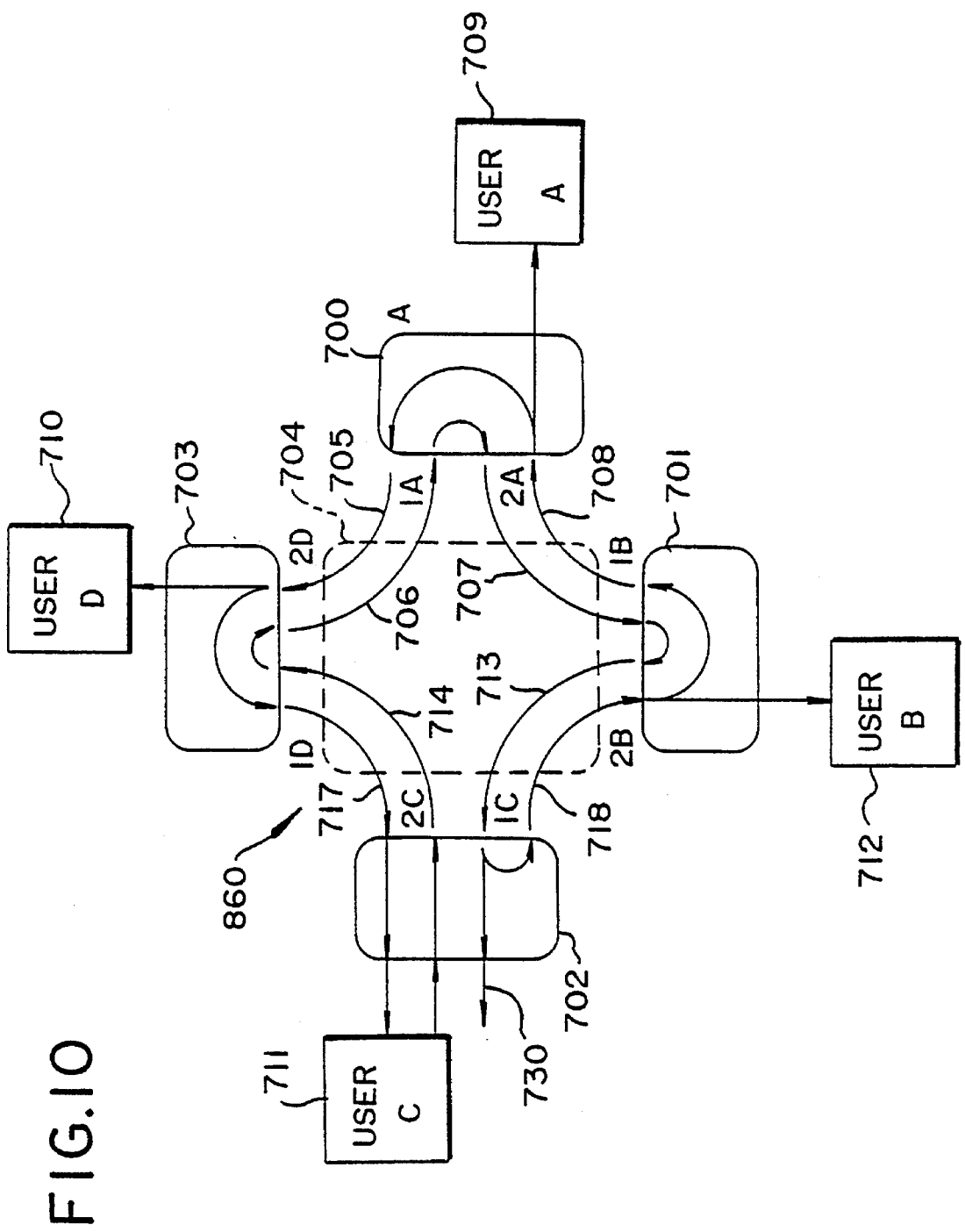
FIG. 10 schematically illustrates a dial-up bridge network formed according to an embodiment of the present invention.

FIG. 10 shows an arrangement corresponding to that shown in FIG. 9, except that the loop end has been rotated 180 degrees because user 702 is transmitting. That is, in FIG. 10, none of the external connections has been changed among the dialing inverse multiplexers 700–703, however the internal connections at the dialing inverse multiplexers 700 and 702 have changed, corresponding to the users A and C.

That is, in FIG. 10, the dialing inverse multiplexer 700 has been internally configured (in a manner described hereunder with regard to FIG. 13) so that the received signals are looped-back between ports 1A and 2A such that the received signals are retransmitted as output signals as described above with reference to FIG. 9, and the received signal is monitored by the user A. The dialing inverse multiplexer 702 has been internally configured so that the received signals are not looped-back between ports 1C and 2C. Instead, the transmitted signal originates at user C (who is now "speaking") and is output at port 2C along path 714. This transmitted signal is received, replicated, and retransmitted at each of the dialing inverse multiplexers 703, 700, and 701 sequentially, and is received at port 1C of the dialing inverse multiplexer 702. The signal received at port 1C of the dialing inverse multiplexer 702 along path 713 is output from the dialing inverse multiplexer 702 as an output signal 730 which is supplied to a monitor (the output signal 730 is taken from port 1C as indicated by the branched straight arrow inside the block element representing the dialing inverse multiplexer 702) and also is replicated and retransmitted (as indicated by the curved branched arrow inside the block schematically indicating the dialing inverse multiplexer 702) along path 718 and back through the dialing inverse multiplexers 701, 700, and 703 sequentially, where the received signal is also output (as indicated by the forked, curved arrows) to the respective users 712, 709, and 710 sequentially. Finally, the received signal at port 2D of the dialing inverse multiplexer 703 is replicated and retransmitted along path 717 where it is received at port 2C of the dialing inverse multiplexer 702.

Figure 11:
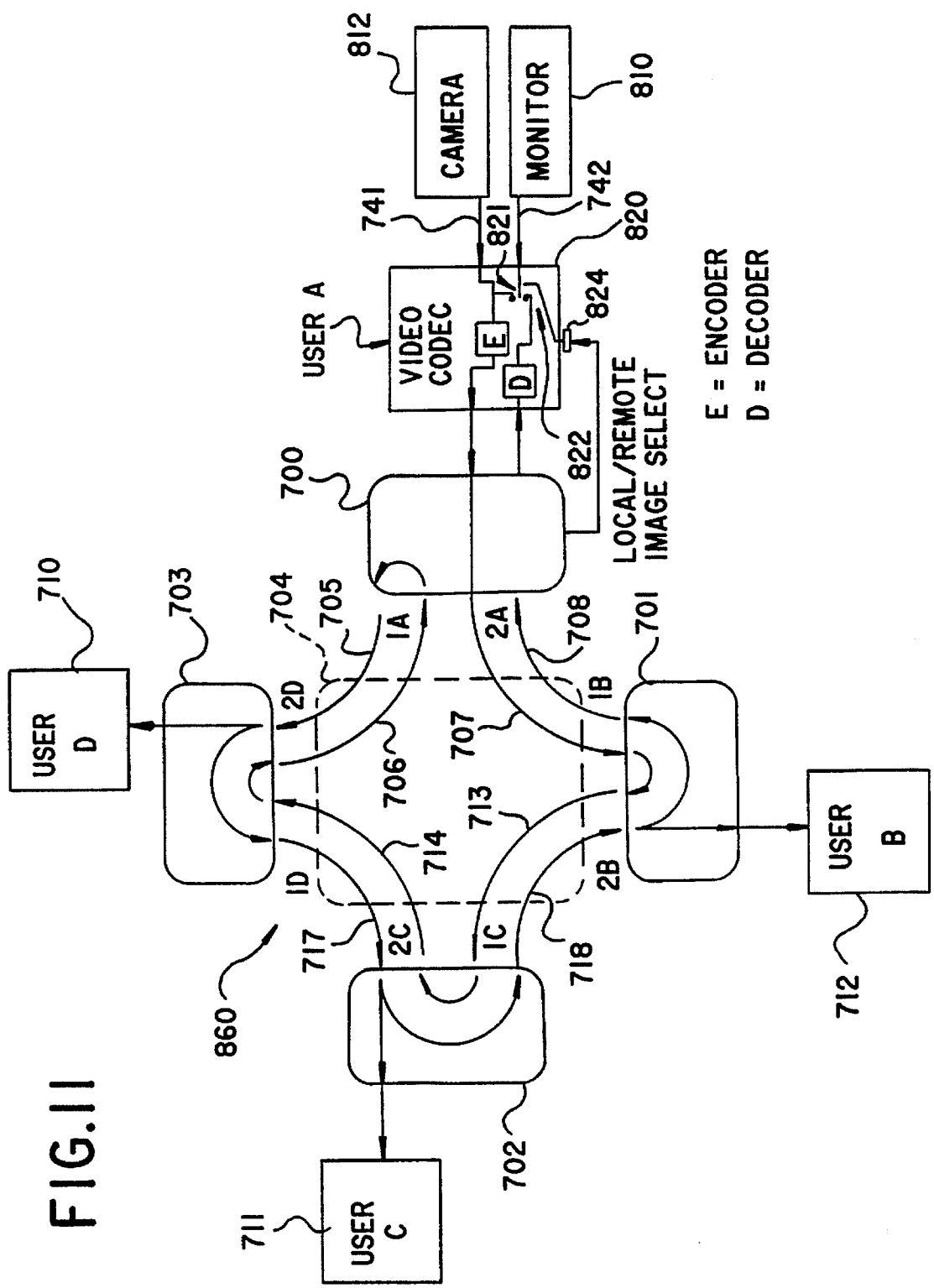
FIG. 11 schematically illustrates a dial-up bridge network formed according to the preferred embodiment of the present invention.

The aforementioned situation ensuing from the embodiment of FIGS. 9 and 10, wherein in the case of videoconferencing the image of the speaker is delayed by the time required for the image to circulate around the loop 860, can be avoided by the embodiment of a network shown schematically in FIG. 11. In the following discussion, the terms "head" and "tail" are used, in which the "head" refers to the transmitting port of the speaker where the signal is first transmitted, and the "tail" refers to the second port of the speaker which receives the transmitted signal and retransmits it. In the case where the data circulating on the loop 860 is used for video conferencing, the dialing inverse multiplexers 700–703 always "know" where the head and tail of the loop 860 are located, due to control information supplied to each of the dialing inverse multiplexers 700–703 either with the data stream or on a separate control line, as discussed further below. It is only necessary for the dialing inverse multiplexer serving as the head and tail (i.e., user A in FIG. 11) to "know" that it is the head and tail, since the users B, C, and D are unaffected by this information except to "know" that they themselves are not the "head and tail" dialing inverse multiplexer.

As shown in FIG. 11, a video CODEC is attached as user element 709 to the dialing inverse multiplexer 700, and serves as the user A. The dialing inverse multiplexer 700 is connected to supply a local/remote image select signal to the video CODEC (user A) to control operation of a switch 820. The switch 820 is preferably a logical switch, and is described in detail below. The video CODEC attached as user element 709 (user A) is connected by a path 741 to receive the output signal from a video camera 812, and is also connected by a path 742 to supply an output signal to a video monitor 810.

The switch 820 includes a contact 821 which is in electrical communication with the video camera 812, and a contact 823 which is in electrical communication with the monitor 810. A contact 822 is in electrical communication with the output of the CODEC's decoder, which in turn is driven by port 2A of the dialing inverse multiplexer 700 receiving the transmitted signal. The switch 820 carries a movable contact element 825 which can be actuated to selectively connect the monitor 810 so that it receives either the received signal from the decoder via the contact 822, or the signal output from the video camera 812 via the contact 821.

The switch 824 is schematically shown as a mechanical switch having an actuating button 824, and such a mechanical switch can be used in this arrangement. In that case, the switch 820 can be selectively actuated to control the position of the movable contact element 825, and can be manually operable, or can be controlled to be operable by an actuating device such as a solenoid, an acoustically actuated switch 820, a pneumatic control, or any other control device. Furthermore, although the switch 820 is schematically shown as a mechanical switch, it will be understood that the switch 820 can be a logical switch or other type of electronic switch. In the case of an electronic switch, actuation of the switch 820 can be accomplished under software control.

In the case of a mechanical switch, as shown in FIG. 11, the dialing inverse multiplexer 700 which is serving as the "head and tail" (i.e., as the speaker) can actuate the movable contact element 825 of the selector switch 820. Alternatively, in the case where the switch 820 is a logical switch, the contact element 825 can be an electronic connection which is changeable. Actuation of the switch 820 can be made to connect the contact 821 to the path 742 to supply the output of the camera 812 to the monitor 810, causing the speaker (i.e., the individual viewed by the video camera 812) to see a locally-looped back image of himself or herself, rather than one which has been compressed and sent around the loop 860. When transmission is complete, and another one of the users becomes the speaker, the switch 820 reverts back to select the image from the loop 860. Such switches are standard equipment in many commercially available video CODECs. It will be understood, however, that whether the switch 820 reverts back, as well as the chosen circumstances in which this is to happen, can be arbitrarily selected.

FIGS. 9–11 above relate to one implementation which uses a single DS0 channel (arbitrarily selected among the available channels, and arbitrarily numbered channel 1 or channel 2 in the foregoing description of FIGS. 9–11) per communication path. However, an important advantage of the dialing inverse multiplexers 700–703 lies in their individual ability to deliver an aggregate bandwidth of many channels to the user, i.e. by each using a plurality of DS0 channels per path. In the case of video-conferencing, such an increased bandwidth results in improved image quality. Therefore, a plurality of channels could be used by each of the dialing inverse multiplexers 700–703.

Figure 12:
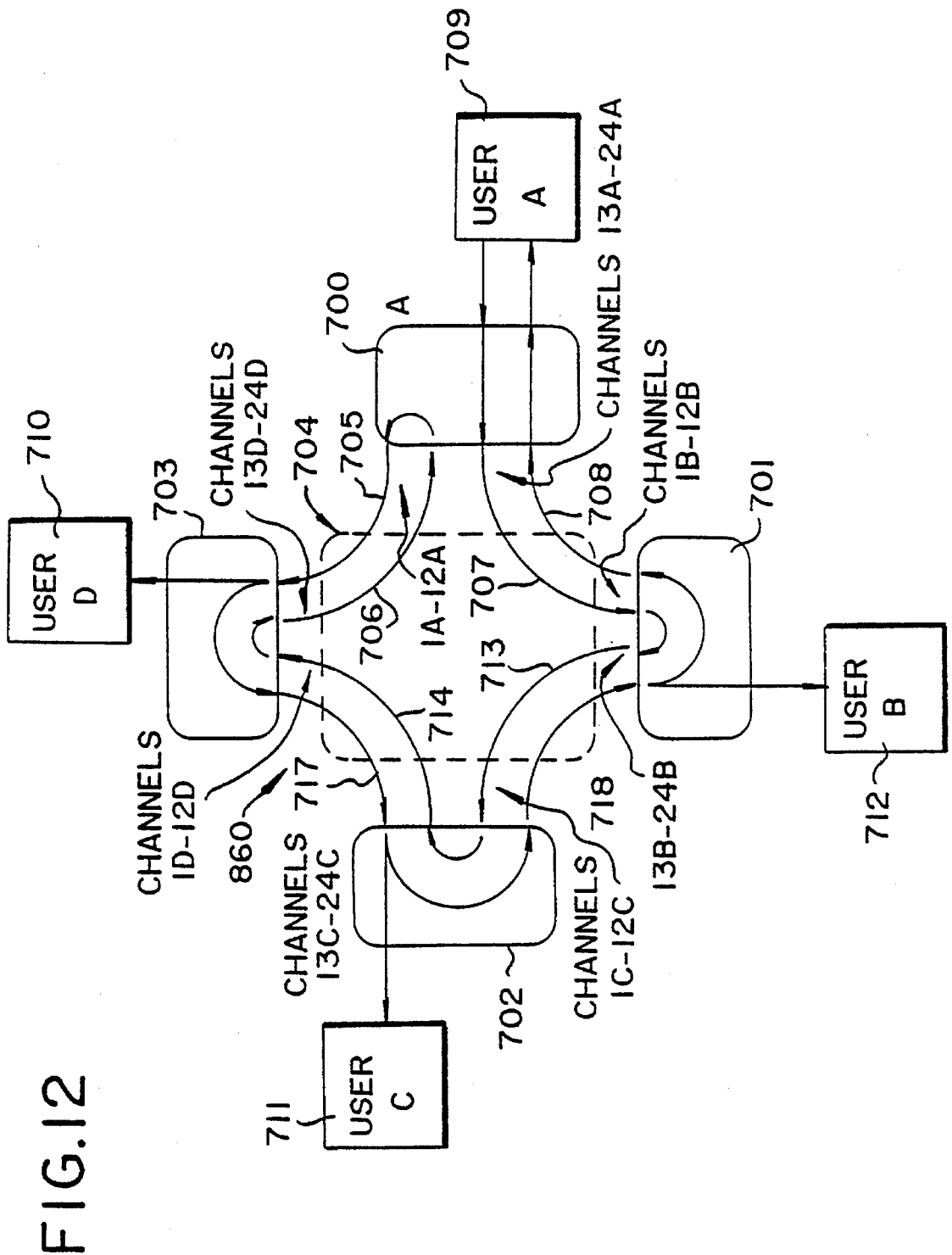
FIG. 12 schematically illustrates a dial-up bridge network formed according to a further embodiment of the present invention.

Another embodiment of the present invention is shown in FIG. 12, which includes a plurality of DS0 channels per path. In this embodiment, 24 DS0 channels are available, and when all of these channels are in use twelve are assigned for output and twelve are assigned for input. These DS0 channels can be arbitrarily selected from the channels available to the dialing inverse multiplexers 700–703, and are hereunder arbitrarily called channels 1–12 and channels 13–24. The discussion of the elements shown in FIGS. 9–11 applies to like-numbered elements in FIG. 12, except that the communication paths 705–708, 713, 714, 717, and 718 each include twelve DS0 channels. With regard to user A, for example, links 707 and 708 are the transmit and receive paths, respectively, each path having twelve DS0 channels of a T-1 communication line, thereby yielding a link bandwidth of 672 KBPS. The other three users B, C, and D are connected in a similar fashion.

It is noted that according to the present invention, there is no requirement that similar channels be used at either end of a switched circuit. The carrier can deliverer them on the channel numbers ordered by the user at the time of installation.

Figure 13:
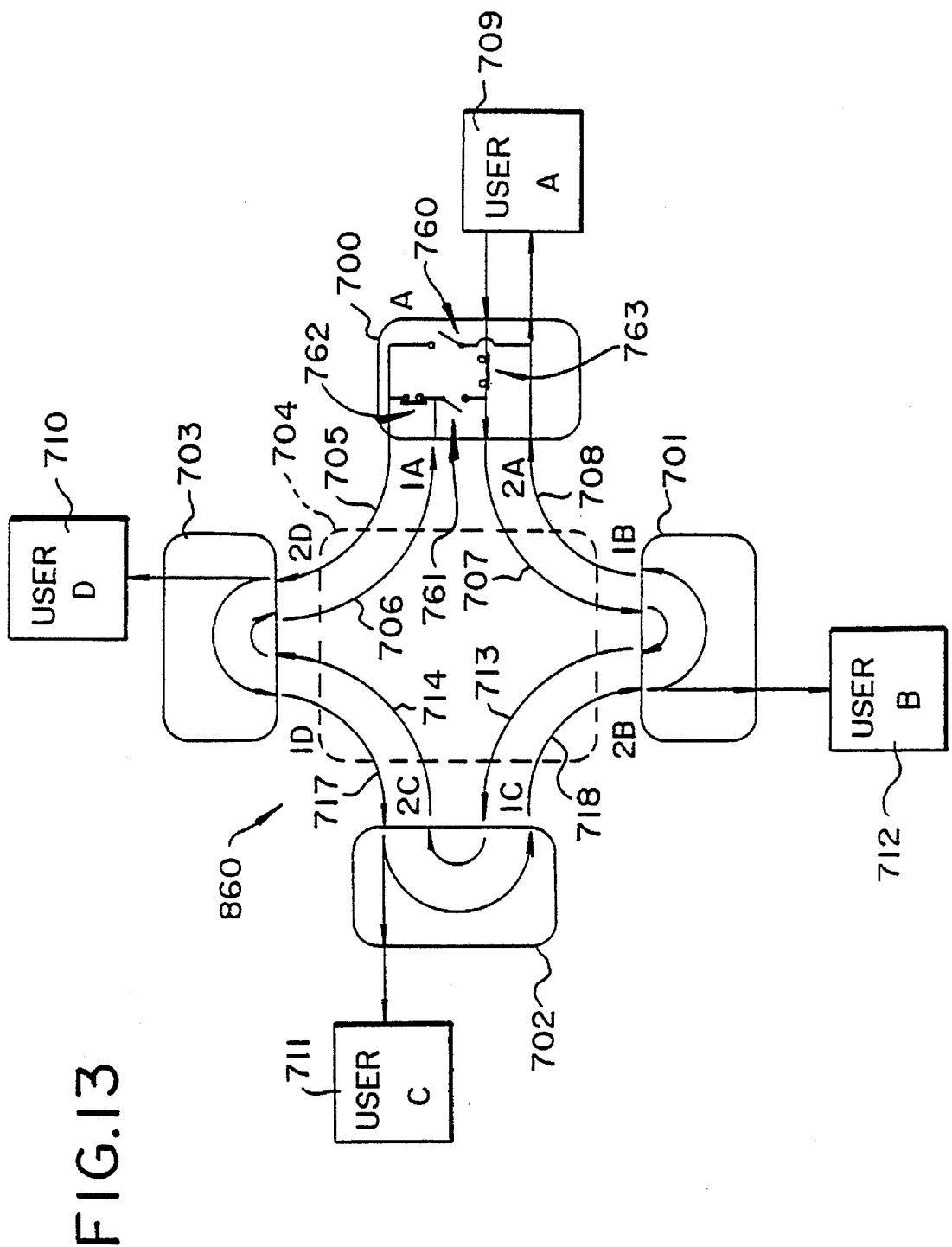
FIG. 13 schematically illustrates a detailed switching arrangement for a given one of the dialling inverse multiplexers, used in the corresponding one of the dialing inverse multiplexers of each of FIGS. 9, 11, and 12.

FIG. 13 schematically illustrates an exemplary detailed switching arrangement for a given one (indicated in this figure as observer A), corresponding to the detailed switching arrangement of the dialing inverse multiplexer 700, as used in each of FIGS. 9, 11, and 12. The schematically indicated switching arrangement of dialing inverse multiplexer 700 in FIG. 13 illustrates conceptually how switches can be set to accomplish control of the data flow. The schematically indicated switch settings for the dialing inverse multiplexers 701, 702, and 703 would be different for the other users B, C, and D, as shown in detail in FIG. 15, for example. The switching which is schematically shown in FIG. 13 is actually accomplished using data path switching, which must be made inside each of the individual ones of the dialing inverse multiplexers 700–703.

As shown in FIG. 13, schematically-shown switches 760, 761, 762, and 1763 determine whether the received signal is retransmitted, how it is looped-back (if at all), and whether it is supplied to the user A. The retransmission itself is accomplished as discussed above with reference to FIGS. 8–11. The switch 762 is shown as closed in FIG. 13, connecting paths 705 and 706 to cause loop-back of the data carried on path 706. The switch 761 is shown as open in FIG. 13, preventing connection of paths 706 and 707. The switch 760 is open in FIG. 13, preventing connection of the paths 708 and 705 (i.e., no retransmission of data can occur where the path is open). The switch 763 is closed, connecting the user 709 with the path 707. The switches 760–763 can be switched differently to form the various output connections shown in the preceding figures.

The present invention can be implemented by other devices instead of the above-noted commercially available dialing inverse multiplexer. For example, the same conferencing technique could be accomplished with leased wideband circuits or with functional equivalents of the dialing inverse multiplexer, provided a suitable connection arrangement is provided in software or in hardware, capable of arranging the loops or networks shown, for example, in FIGS. 9–15; this would also require that a suitable apparatus be provided for replicating the received data at each location, however, so that each viewer can both receive the transmission and simultaneously re-broadcast it so as to maintain the loop or network in operation. The only requirement of the software or hardware switches is that they properly manage the transfer so as not to disrupt the continuous T-1 framing toward the network.

Figure 14:
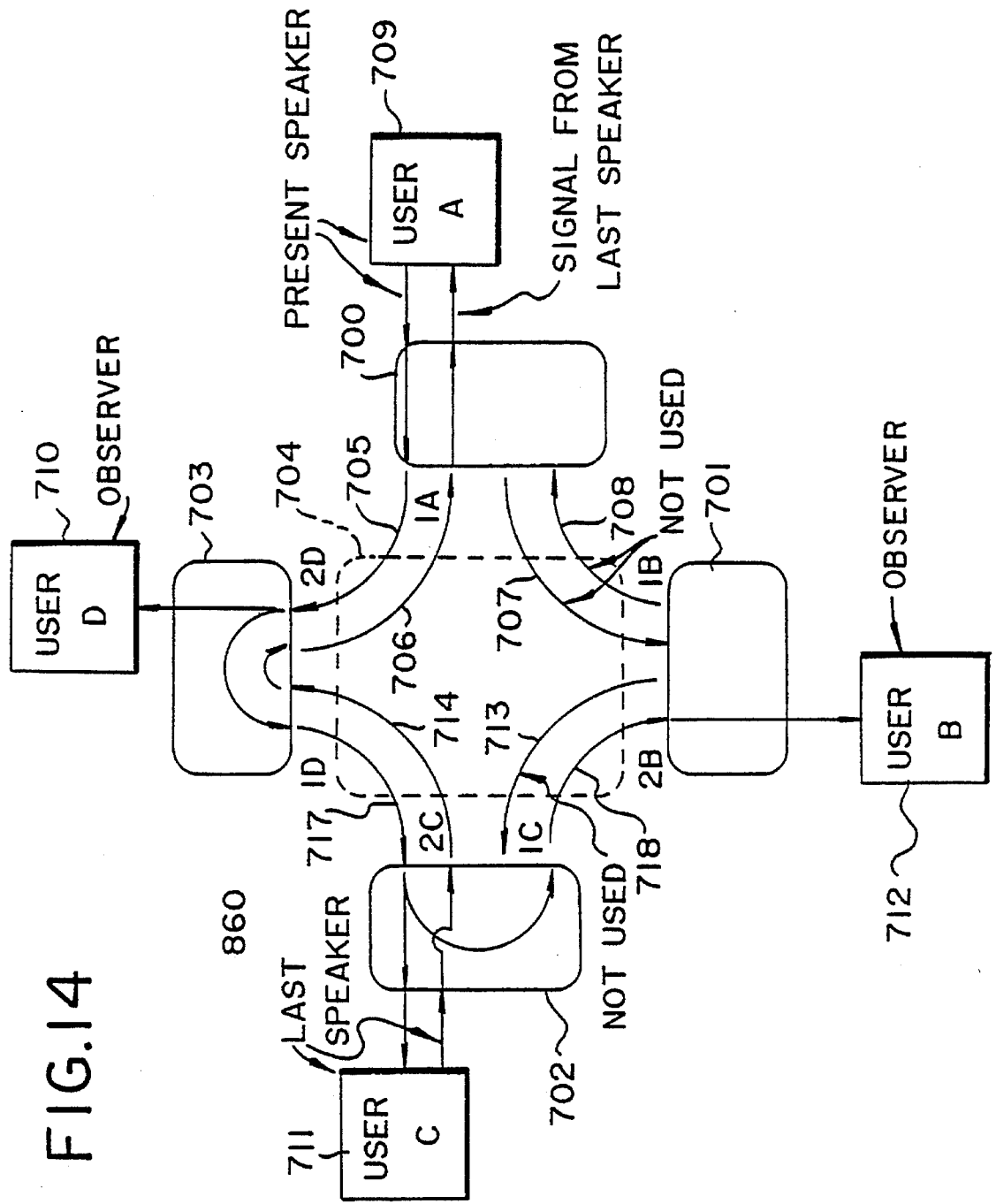
FIG. 14 schematically illustrates a further embodiment of a dial-up bridge network according to the present invention.

Another embodiment of the present invention is shown in FIG. 14, which is at present considered to correspond to the best mode since it is the commercially-implemented embodiment. In this embodiment, there are three types of users, these users being the present speaker, the last (i.e., previous) speaker, and an observer, respectively. These types of users are defined by the control arrangement employed, and this control arrangement can be accomplished either in software (as discussed above) or in hardware, as shown in FIG. 16 below.

In FIG. 14, the counterclockwise loop 860 arbitrarily carries the signal of the present speaker, while the clockwise loop 860 carries the signal of the last speaker. The present speaker always receives the signal of the last speaker. The observers always receive the signal of the present speaker. In the arrangement shown in FIG. 14, paths 707, 708, and 713 are not used except to carry control information.

Figure 15:
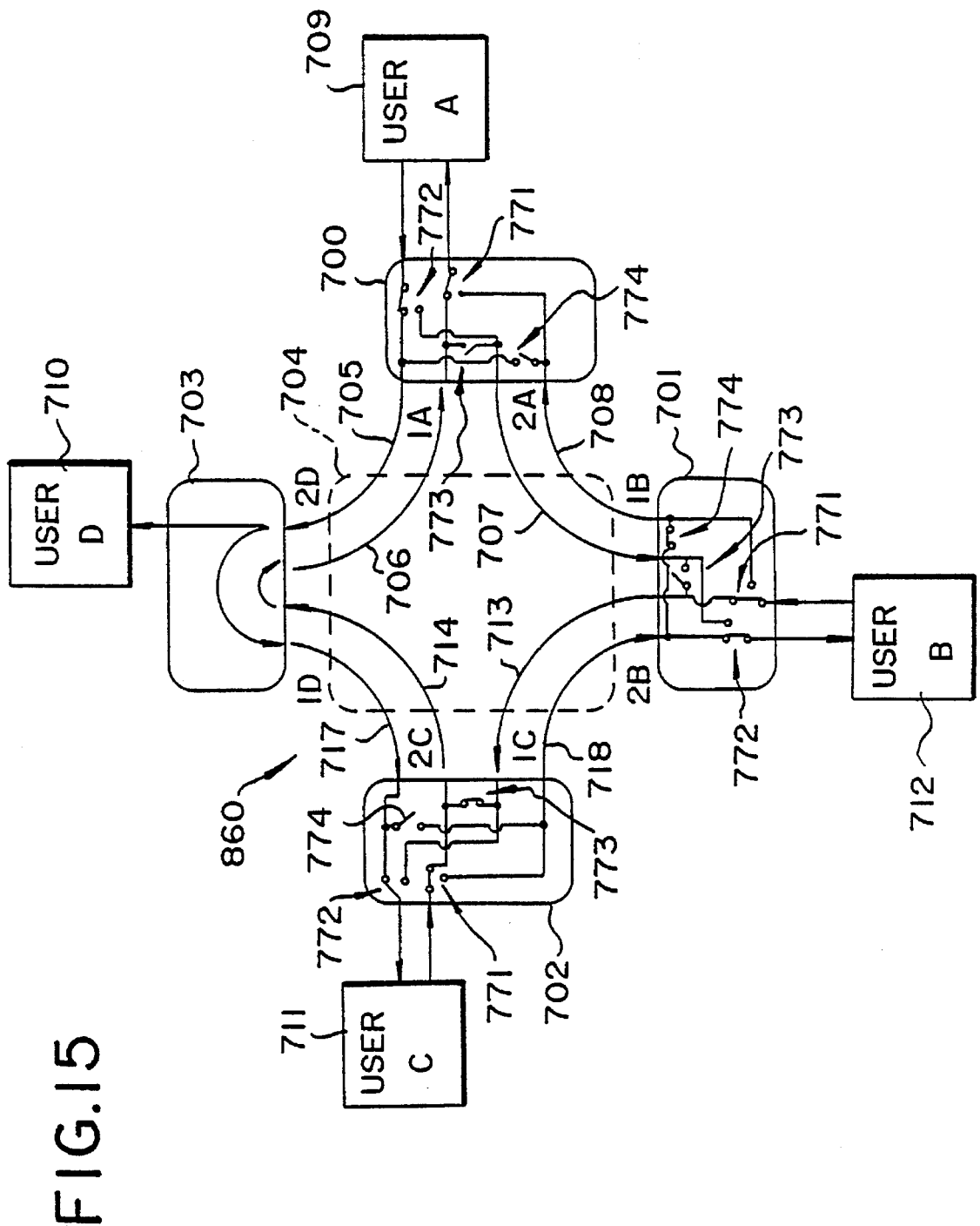
FIG. 15 schematically illustrates a switching arrangement in a dialing inverse multiplexer of FIG. 14.

The required switching for the embodiment of FIG. 14 is shown in FIG. 15. Switches 771, 772, 773, and 774 (which are schematically shown) are switched as shown for each of users A, B, and C, to accomplish the arrangement shown in FIG. 14. The logical intention of these switches is relected in FIG. 19, where a line intersection indicates a possible connection point and a dot at that point indicates connected status.

A tape storage unit can also be connected to store video signals received at any of the dialing inverse multiplexers 700–703. Furthermore, such storage unit (not shown) can instead be a RAM memory device, an optical disk storage device, or any other storage apparatus.

Figure 16:
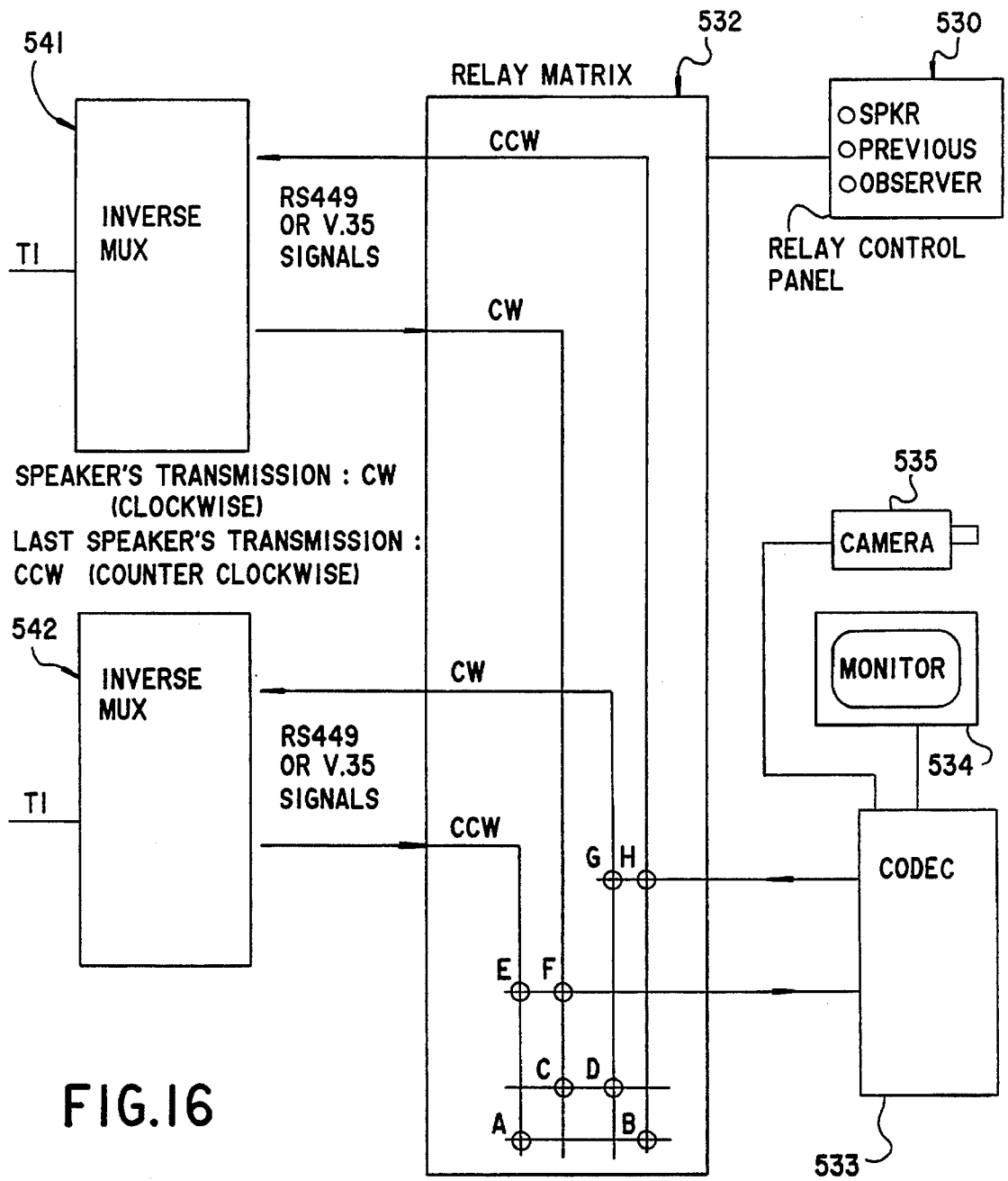
FIG. 16 schematically illustrates a dial-up bridge network formed according to a still further embodiment of the present invention, using a relay network having a plurality of individually controllable relays.
Figure 19:
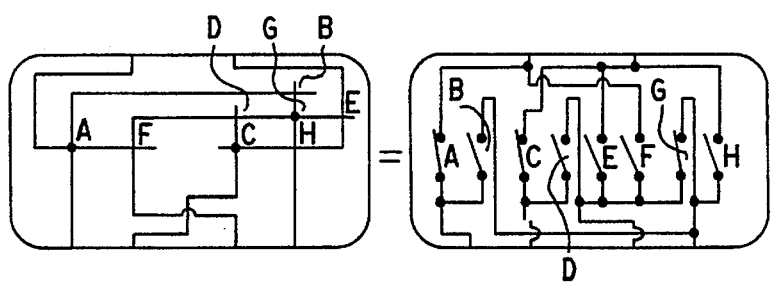
FIG. 19 indicates equivalent circuit representations for indicating the positions of switches A–H according to a dot representation.

FIG. 16 illustrates one type of a detailed switching arrangement for making possible a dial-up bridge network, using two independent, commonly available dialing inverse multiplexers, or a single unit capable of multiple independent calls, wherein the switching arrangement is made by hardware rather than software. In this figure, a dialing inverse multiplexer 541 and a dialing inverse multiplexer 542 are shown which are linked in a network or loop arrangement. Also, at each location of a dialing inverse multiplexer, a set of relays A–H are provided for connecting the respective dialing inverse multiplexer to a CODEC 533. The settings of relays A–H can be interpreted as shown in FIG. 19, discussed below, showing equivalent representations of the dot connections indicated in this figure. The CODEC 533 is operatively connected to a monitor 534 for displaying received transmissions (i.e., the speaker or the last speaker) and is also connected to a camera 535 for producing a video signal to be sent via the CODEC 533 to the network when in the "speaker" mode, i.e., broadcasting to the network or loop.

A hardware (rather than software) switching arrangement is shown in FIG. 16 which includes a relay matrix 532 having, at each location of a dialing inverse multiplexer, a plurality of relays A–H which are individually controllable. For the sake of clarity, only the set of relays A–H at the multiplexer 542 is shown, however there would also be a set of such relays at the dialing inverse multiplexer 541, and at each other dialing inverse multiplexer in the network or loop. The hardware switching arrangement of FIG. 16 also includes a relay control device 530 capable of supplying control signals for controlling each set of relays A–H at each separate location.

For the relay matrix 532, any known relay control means, such as a plurality of manually controllable switches or the like, could be used to control the relays A–H at each location. The control signals from the relay control device 530 can for example be transmitted by any telecommunications method, including ordinary telephone transmission, dedicated control cables (for a local network), laser communications, satellite communications, and so on. The relay control device 530 can be arranged to control the individual relays A–H to cause the data flow to conform to any one of the networks or loops shown in any of FIGS. 9–15, for example.

If manually controllable switches are used for the relays A–H, groups of such switches could be arranged to be controlled in unison by throwing of a single manually-operable switch, such groups of switches being in predetermined configurations. Alternatively, an automatic control means could be arranged for controlling the relays in response to a signal (which could be a manually-triggered signal or a transmitted electrical signal), for example an analog or digital control method could be used. Such relay control methods are well known and are not further discussed herein.

In FIG. 16, circles labelled A–H represent locations where a circuit connection can be made or broken (i.e., opened or closed) by a relay, in order to correctly route the desired flow of data. As shown in this figure, the speaker's transmission is switched to follow a clockwise path around the loop, while the last speaker's transmissions are switched so as to follow a counter-clockwise path around the loop. In FIG. 16, each dialing inverse multiplexer is connected by the switching arrangement to have one of three possible functions, as (a) a speaker, (b) the last speaker, and (c) an observer.

For the dialing inverse multiplexer which is currently designated the speaker, as indicated in FIG. 16 the switches A, B, E, and G are closed and all other switches are open. Thus, the speaker broadcasts its own signal as a clockwise transmission (labelled cw in FIG. 16) while receiving the last speaker's transmission.

The switch settings are different for the case where the dialing inverse multiplexer is connected at the previous speaker. In order to transmit the previous speaker's signal to the current speaker, the switches at the previous speaker's dialing inverse multiplexer are set, according to FIG. 16, so that switches C, D, F, and H are closed.

Finally, for an observer (which includes any dialing inverse multiplexer other than the speaker and last speaker) to receive only the current speaker's signal (while passing on the signal of the previous speaker in the opposite direction), switches A, B, C, D, and either E or F are closed. In this arrangement, the last speaker, i.e. at the dialing inverse multiplexer which was previously designated and switched to broadcast as a speaker, can only be viewed by the present speaker.

As noted in the preceding examples, the speaker's signal and the previous speaker's signal are both passed on down the loop or network. For example, two-way modems could be used to send the control signals, forming request/ascend lines governing who is the speaker, previous speaker, and observer. However, in a still simpler embodiment, it is not even necessary to have such a request/ascend line. Further, the speaker and observers can be predetermined in advance, so that switching is prearranged and no two-way control communications would be necessary (e.g., the two-way modems would not be necessary).

While one type of exemplary hardware arrangement is schematically shown in FIG. 16, it is contemplated that any type of connection arrangement using software switching, hardware switching, or a combination of software and hardware switching, can be provided, and all such variants are contemplated as being within the scope of the present invention.

FIGS. 17A, 17B, and 17C schematically illustrate three possible configurations which are possible for each node, with specific reference in these figures to the specific ports used and to the left-side and right-side channels. In particular, in FIG. 17A, an "IDLE" mode is shown, wherein a dialing inverse multiplexer is configured by the switching shown to receive transmissions from both the last speaker (labelled LS in FIGS. 17A–C) and the current speaker (labelled CS in FIGS. 17A–C) from two adjacent respective nodes of a loop (not shown in FIGS. 17A–C). These transmissions are then re-sent to the other respective ones of the two adjacent nodes, as shown in FIGS. 17A–C.

In FIG. 17A, the port 0 receives the signal from the current speaker (CS), and is connected to a CODEC (not shown in FIG. 17A). Also, a connected monitor (not shown in FIG. 17A) connected to receive the transmission from port 0, can display the received transmission. On the right side of the dialing inverse multiplexer in FIG. 17A, port 1 is used.

Several important physical components in the Fracdial™ brand dialing inverse multiplexer are schematically indicated and referred to in FIG. 17A, namely the ADD/DROP Matrix at port 1 and the loopback controller at port 1. The loopback controller enables the signal to be both received at port 1, while at the same time an identical signal is sent (i.e., thereby "looping back") to be transmitted to the next node in the network or loop.

FIG. 17B illustrates a node in a network or loop similar to that shown in FIG. 17A, but configured (by software, for example, in the Fracdial™ brand dialing inverse multiplexer) to operate as the current speaker (CS). In this arrangement, port 0 is connected to transmit the signals from the CODEC unit to the network or loop. However, this node does not continue to receive the signals from the speaker, but instead ports 0 and 1 both receive the signals from the last speaker (LS).

FIG. 17C illustrates a node in a network or loop similar to that shown in FIG. 17A, but configured (by software, for example, in the Fracdial™ brand dialing inverse multiplexer) to operate as the last speaker (LS). In this arrangement, port 0 is connected to receive the signals from the current speaker (CS) from the network or loop, while transmitting from port 0 the signals from the CODEC unit to the network or loop as the signals for the last speaker (LS). Looping back of the signal CS is performed at port 1 in this figure, so that the next adjacent node in the network or loop will continue to receive the signal for the current speaker (CS).

FIGS. 18A–18D relate to the use and processing of control information according to an embodiment of the invention. In particular, FIGS. 18A, 18B, and 18C schematically illustrate three possible configurations which are possible for each node, in correspondence with FIGS. 17A–17C discussed above but with specific reference in these figures to the passing of control information. In particular, in FIG. 18A, an "IDLE" mode is shown, wherein a dialing inverse multiplexer is configured by the switching shown to receive transmissions REQ, which indicates a request packet, and STATUS, which indicates a status packet, from two adjacent respective nodes of a loop (not shown in FIGS. 18A–C). These transmissions are then re-sent to the other respective ones of the two adjacent nodes, as shown in FIGS. 18A–C.

In FIG. 18A, which is the IDLE mode, the port 2 receives the signal REQ from a first, adjacent node, and loops this signal back to a second, adjacent node. The terms first and second are arbitrary, and refer simply to the two adjacent nodes to the one depicted in this figure, in the network or loop. The port 3 receives the signal STATUS from the second, adjacent node, and outputs this signal as intricated at the block RECEIVE STATUS, and also loops this signal back to the first, adjacent node.

FIG. 18B illustrates a node in a network or loop similar to that shown in FIG. 18A, but configured to operate as the MASTER UNIT (i.e., with reference to FIGS. 17A–C, serving as the current speaker"). In this arrangement, port 3 is connected to transmit the signals for the STATUS PACKET to the first, adjacent node (which is mentioned above with respect to FIG. 18A). Thus, this node supplies its own STATUS PACKET to the network or loop. However, the received REQ signal is examined (which can be performed by software control in the Fracdial™ brand dialing inverse multiplexer) to receive a speaker request (indicated schematically in FIG. 18B). This speaker request, if carried on the network or loop, carries information indicating that another node has requested to be the SPEAKER UNIT. Also, instead of looping back the REQ signal received from to the network or loop, the SPEAKER UNIT shown in FIG. 18B supplies a new request signal REQ, which is "idle", and which signal in the current embodiment is all 1's (ones).

FIG. 18C illustrates a node in a network or loop similar to that shown in FIG. 18A, but configured to operate as a requesting unit, which is requesting to be the next speaker.

Here, a request packet is supplied to the above-mentioned second, adjacent node. At this node, the received REQ signal from the above-mentioned first, adjacent node is not looped-back to the network or loop. Thus, this node supplies the REQ signal to the network or loop. In a manner identical to that shown in FIG. 18A, the port 3 receives the signal STATUS from the second, adjacent node, and outputs this received signal as indicated at the block RECEIVE STATUS, and also loops this signal back to the above-mentioned first, adjacent node.

FIG. 18D illustrates the contents of the REQUEST packet and the STATUS packet. Both are signals having 20 bits, with the last four bits in the REQUEST packet being reserved for digits specifying the node identification (indicated in this figure as NNNN, the node ID). The last four digits in the STATUS packet are reserved for digits specifying the identification of the node of the last speaker (indicated in this figure as LLLL, the node ID of the last speaker). The next-to-last grouping of four digits in the STATUS packet are reserved for digits specifying the identification of the node of the current speaker (indicated in this figure as CCCC, the node ID of the current speaker).

FIG. 19 indicates equivalent circuit representations for indicating the positions of switches A–H according to a dot representation (on the left portion of the figure) and an equivalent, classical representation (on the right portion of the figure). This figure is presented simply for illustration of elements which are used in the following figures.

Figure 20:
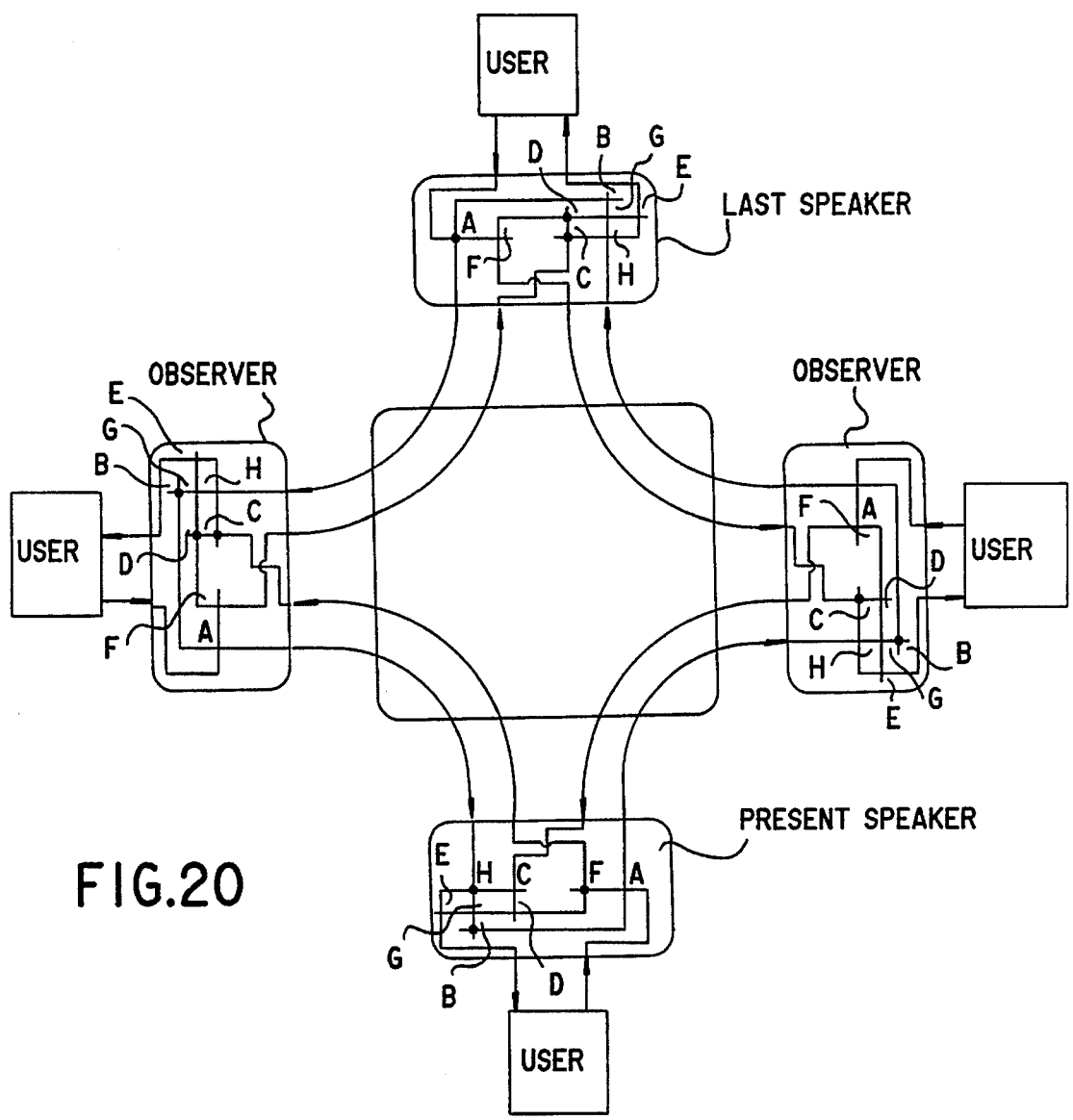
FIG. 20 illustrates a network or loop wherein specific switch arrangements are shown for each of the nodes on the loop.

FIG. 20 illustrates a network or loop of the type discussed in the preceding figures, wherein the specific switch arrangements are shown for each of the nodes on the loop. These nodes include the speaker node, the last (i.e., previous) speaker, and two observer nodes. There can be an arbitrarily large number of observers, however for large networks it may be necessary to use a longer control code or even a different form of control code, so as to enable identification of each node.

Figure 21:
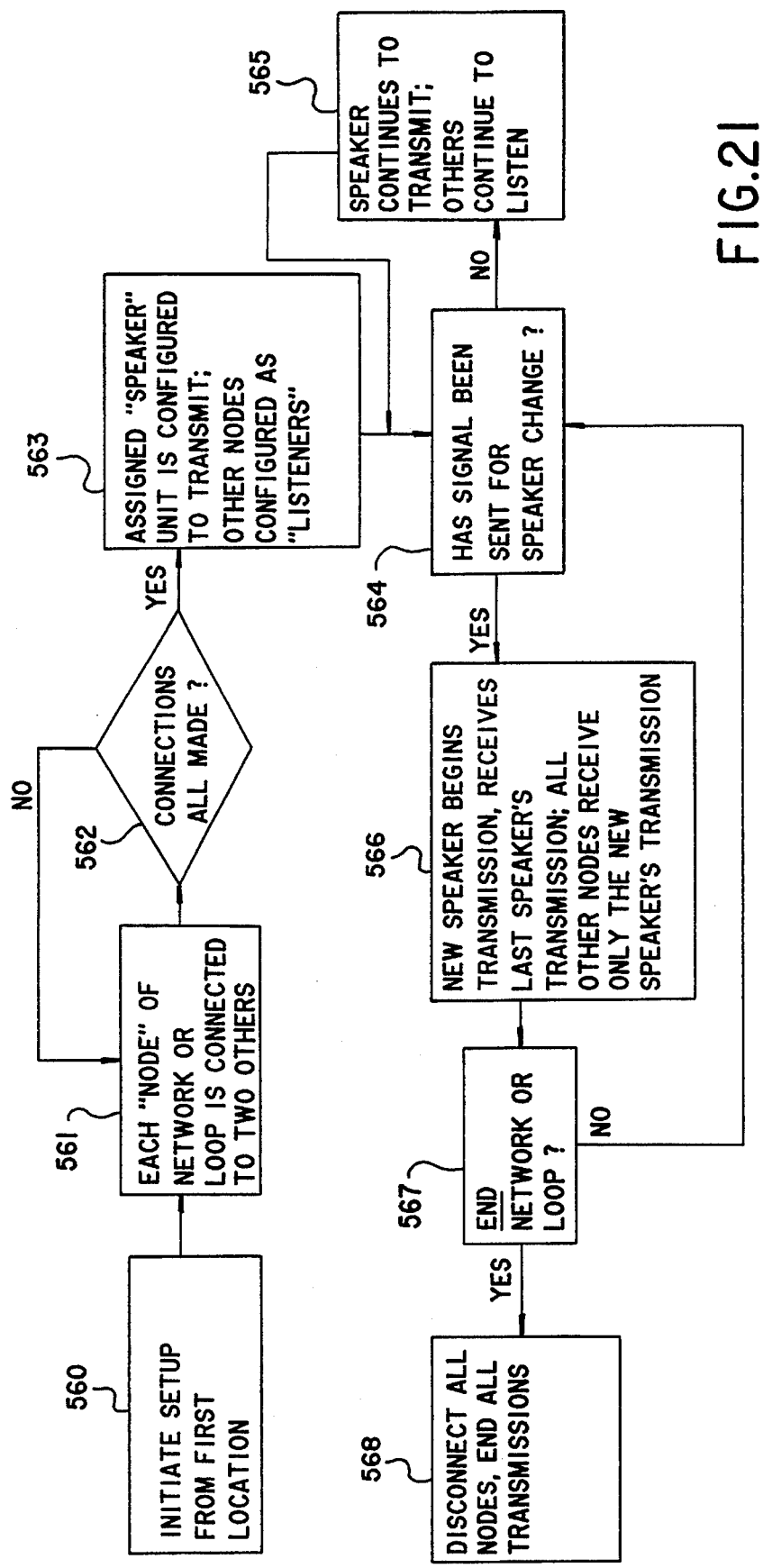
FIG. 21 is a simplified flowchart depicting steps used in forming the network or loop using the above-noted commercially available dialing inverse multiplexer.

FIG. 21 is a simplified flowchart depicting steps used in forming the network or loop using the above-noted commercially available dialing inverse multiplexer. The steps shown in FIG. 21 are not limited to use with the commercially available Fracdial™ dialing inverse multiplexers described above, but can also be applied to any generally equivalent type of dialing inverse multiplexer device, such as discussed above.

As shown in FIG. 21, at block 560 setup of the network or loop is initiated. The initiating one of the dialing inverse multiplexers is supplied with a list of telephone numbers representing each of the dialing inverse multiplexers to be includes in the particular loop or network to be formed. This involves either one of two processes. In the first of the two available processes, the initiating one of the dialing inverse multiplexers calls up only one of the other selected dialing inverse multiplexers, sending the list of telephone numbers. The caller and receiver dialing inverse multiplexers remain connected thereafter. The second one of the dialing inverse multiplexers then calls up the next one on the list, supplying it with the telephone numbers, the caller and receiver dialing inverse multiplexers again remaining connected thereafter. The third dialing inverse multiplexer calls up the next one on the list, and so on until all of the dialing inverse multiplexers are connected together. They then remain connected in the order assigned.

In the second setup process which can alternatively be used, the first dialing inverse multiplexer simultaneously calls up all of the other selected dialing inverse multiplexers on the list, informing them of which dialing inverse multiplexers (by their telephone numbers) each is to be connected to in the sequence. Then, the calls are made by each unit to another unit, setting up the network or loop.

Other setup arrangements are possible, for example wherein the work of calling the respective units is handled in smaller groups at a time, or wherein each dialing inverse multiplexer already "knows" which unit to call (i.e., by prestored instruction, etc.) once a starting signal is received. With the commercially available dialing inverse multiplexers described above, all such setup arrangements would be within the ambit of one ordinarily skilled in the art.

Then, at step 561, each node of the network is completed by connection to two other dialing inverse multiplexers, so that a network or loop is formed as described above. At step 562, if connections have not all been made, branching occurs back to step 561 for completion of all connections, for example by passage of a signal among all of the dialing inverse multiplexers on the list (this step can also be implicitly conducted by later determining whether the loop operates, and if not re-connection is made).

Once all connections are established, at step 563 the speaker unit of the dialing inverse multiplexers is configured to transmit. Usually the speaker is the originating one of the dialing inverse multiplexers, but the speaker can be otherwise assigned in any suitable manner, i.e. by manually switching the selected unit, by passage of code along a separate control line linking the units (which can likewise be set up, if so desired, by the dialing inverse multiplexers along a second, separate network using other available channels), or by passage of the code signal along the regular data path.

At step 563, the non-speaker units are configured as "listeners", passing along the signal of the speaker unit to all other units including the speaker unit. However, the speaker unit can display any chosen signal, such as its own signal (passed along the network) or any designated one of the transmissions of the other units which are listeners.

At step 564, it is determined whether the signal for a speaker change has been initiated. If not, branching is to step 565, wherein the speaker continues to be listened to by all of the other units. If a speaker change signal has been received, then branching is to step 566, wherein the new speaker's transmissions are listened to and re-transmitted along the network. The new speaker, in the preferred embodiment, then receives the transmissions of the last speaker, although any other unit's signals could be chosen to be received instead.

At step 567, if the network or loop is to be terminated, branching is to step 568, causing a signal to be sent terminating all connections. If not, branching is back to step 564.

Figure 22:
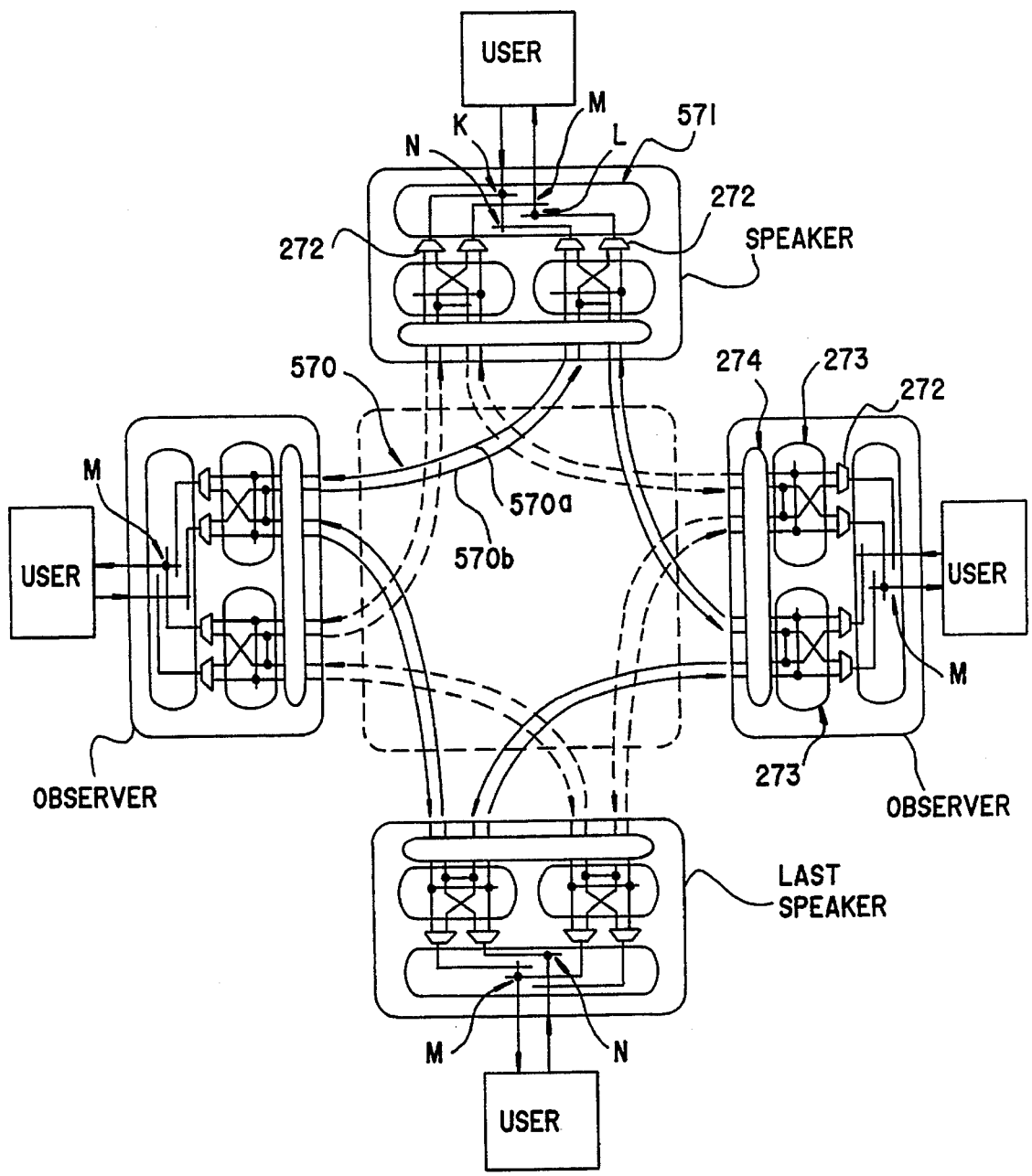
FIG. 22 schematically depicts circuit switching connections for connecting a plurality of dialing inverse multiplexers according to an embodiment of the present invention.

FIG. 22 illustrates another embodiment of the present invention with a slightly different structure. In the commercial embodiment, the drop-and-add or drop-and-pass switching is done on the customer side of the dialing inverse multiplexer. For example, if the bandwidth of the speaker's loop is 336 kbps, the signal which is looped by the observers is also 336 kbps.

In FIG. 22, however, the drop-and-add or drop-and-pass switching is done on a per-channel basis, on the network side of the dialing inverse multiplexer. The network interface 274 delivers 24 (30 in the case of E-1) independent channels to the switching block 273, and can accept that many channels from switch 273 to pass on to the network. Switch 273 forwards a selected set of channels to the dialing inverse multiplexer 272 if the user is transmitting, which would be the case if the user is the speaker.

In the case of FIG. 22, the leftmost trapezoid in the speaker's node accepts data from the user and forwards it to both of the observers as well as the last speaker. That is, it circulates around the loop in both directions simultaneously, with both loops returning to the speaker. Thus, if the bandwidth of the speaker's CODEC is 672 kbps, 336 can be passed in the counterclockwise direction. All of the observers and the last speaker will therefore receive the full 672 kbps signal.

The arrangement as shown for the loop illustrated by the dashed lines in FIG. 22 is half duplex. To form a full duplex arrangement, a similar arrangement is implemented with the loop illustrated by the solid lines.

FIG. 22 schematically depicts that a typical pair of paths 570 includes a counter-clockwise path 570a and a clockwise path 570b.

Additionally, FIG. 22 indicates schematically how the bridge connections are made for the speaker, the last speaker, and the observers. The schematic diagram in FIG. 22 includes a switching portion 571 which includes relays or switches K, L, M, and N, for determining a circuit path to indicate the current speaker and the last speaker. The speaker unit has indicated thereon where relays or switches K, L, M, and N exist, with a solid dot representing a closed switch (consistent with FIG. 19). The speaker unit has relays K and L closed, and M and N open. The last speaker unit has relays or switches M and N closed. The observers have only relay M closed.

In FIG. 22, the trapezoidally-shaped circuit elements 272 symbolize circuit elements in which two or more input data streams converge to a single output stream. Multiplexers are preferably used for this. A control mechanism for these elements 272 is not shown in FIG. 22, nor are detailed circuits shown for such elements 272, but these are considered conventional and known to any one having skill in the art. For example, such elements 272 preferably include slip buffers and/or elastic stores, and can be controlled in the dialing inverse multiplexer of FIGS. 5A and 5B by software as discussed hereinabove, or alternatively known types of hardware such as two-to-one multiplexers can be used, so long as the intended function shown is retained. Likewise, the dots representing the switches or relays A–H and K–N can include many-to-one multiplexers, such as four-to-one multiplexers.

A network interface 274 is shown in FIG. 22, which performs necessary functions to interface with the network. For example, the network interface 274 includes a synchronizer, network diagnostic services, alarm reporting, and repeater timing, and synchronizes signals to accommodate the network, so that the user can be free to do anything with the signals. Also, each unit has a schematically-indicated switch matrix 273 on the input and the output sides, to accomplish appropriate switching for supplying the incoming and outgoing data to the circuit elements 272, to route the data to the appropriate data paths.

Figure 23:
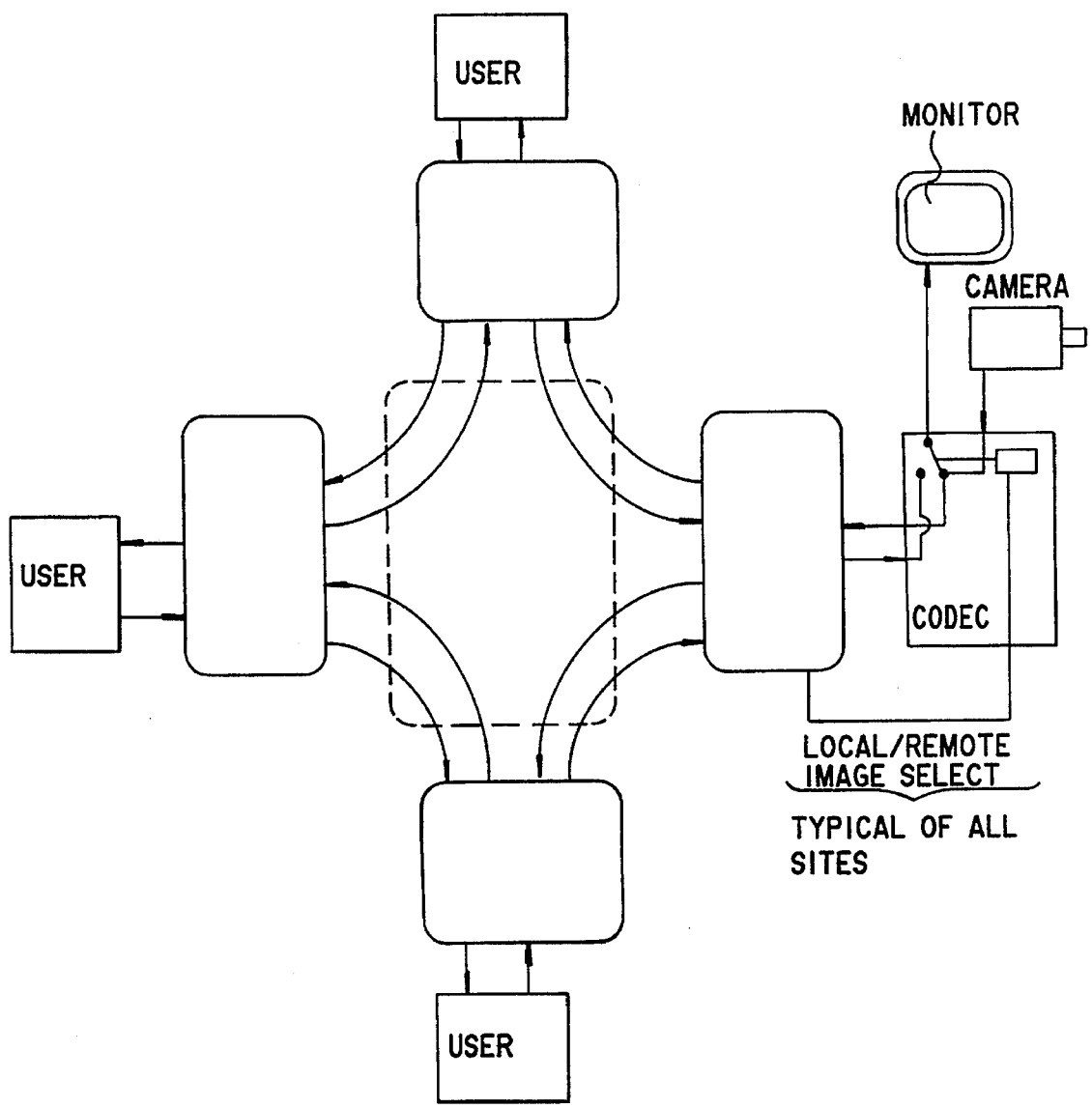
FIG. 23 schematically illustrates switching arrangements for a video control option for use of a CODEC, monitor, and camera at each site.

FIG. 23 schematically illustrates switching arrangements for a video control option for use of a CODEC, monitor, and camera at each site. It is possible with the connections shown to selectively accomplish either a local image select function or a remote image select function.

Figure 24:
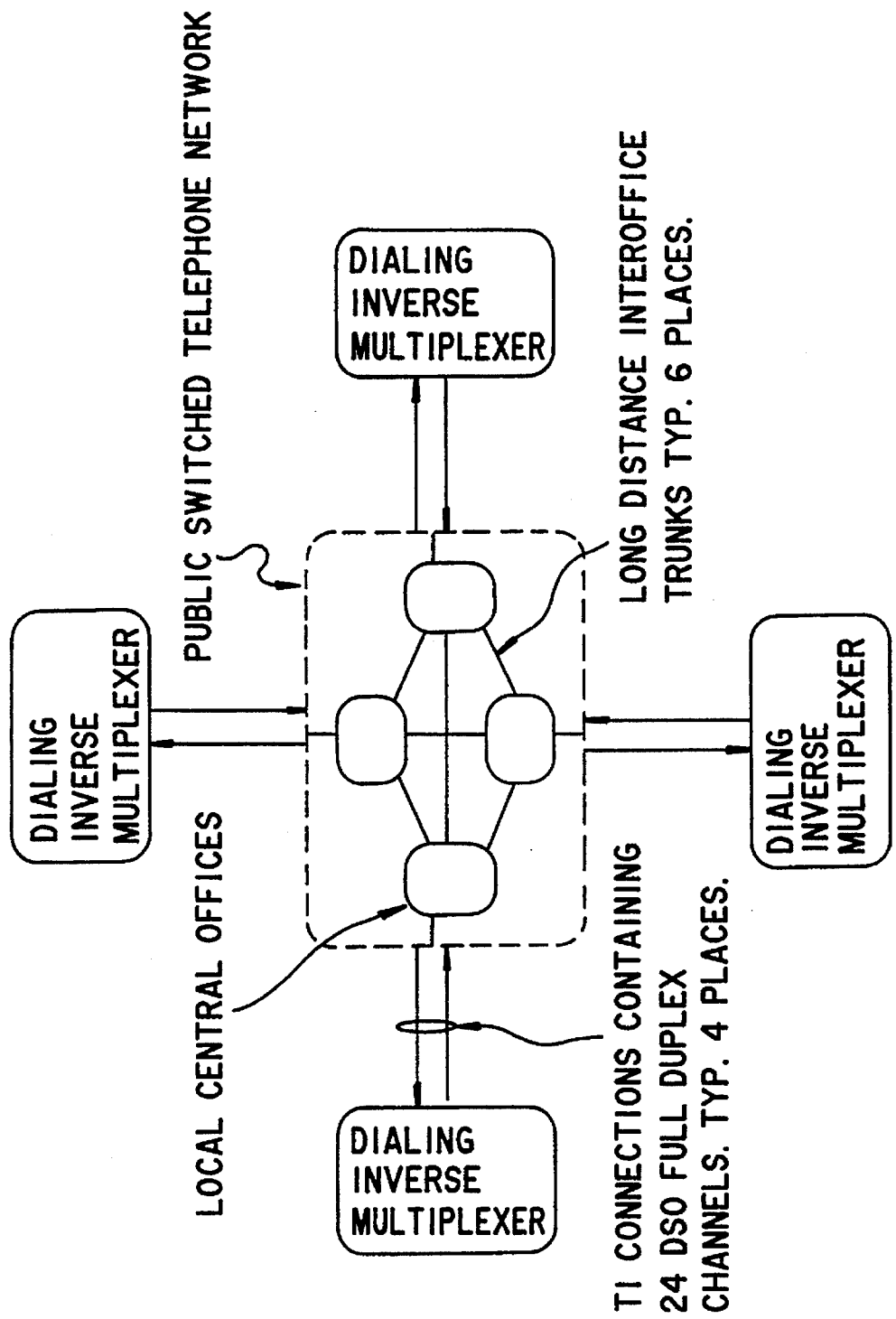
FIG. 24 schematically illustrates a video connection to a public switched network.

FIG. 24 schematically illustrates a video connection to a public switched network. The public switched network includes local central offices for each of the dialing inverse multiplexer locations, and long distance trunks connecting these offices. Each of the dialing inverse multiplexers is connected to the network by T-1 connections containing 24 DS0 full duplex channels.

Figure 25:
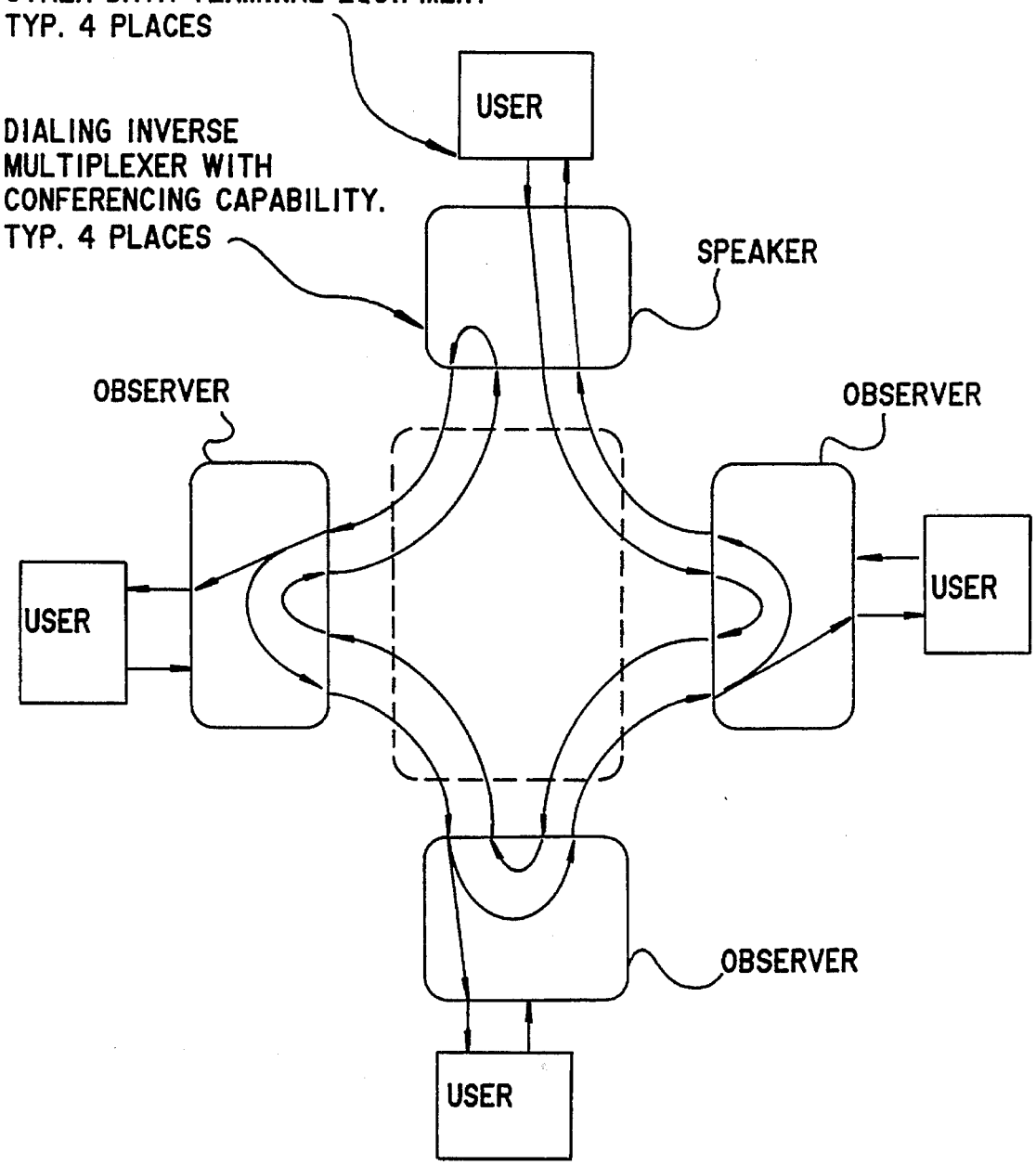
FIG. 25 schematically illustrates data flow in a simple half-duplex loop.

FIG. 25 schematically illustrates data flow in a simple half-duplex loop. The connections for the speaker, the last speaker, and the observers are schematically shown. The operation of this type of loop is as described above with respect to FIG. 9 and the following figures.

Figure 5B:
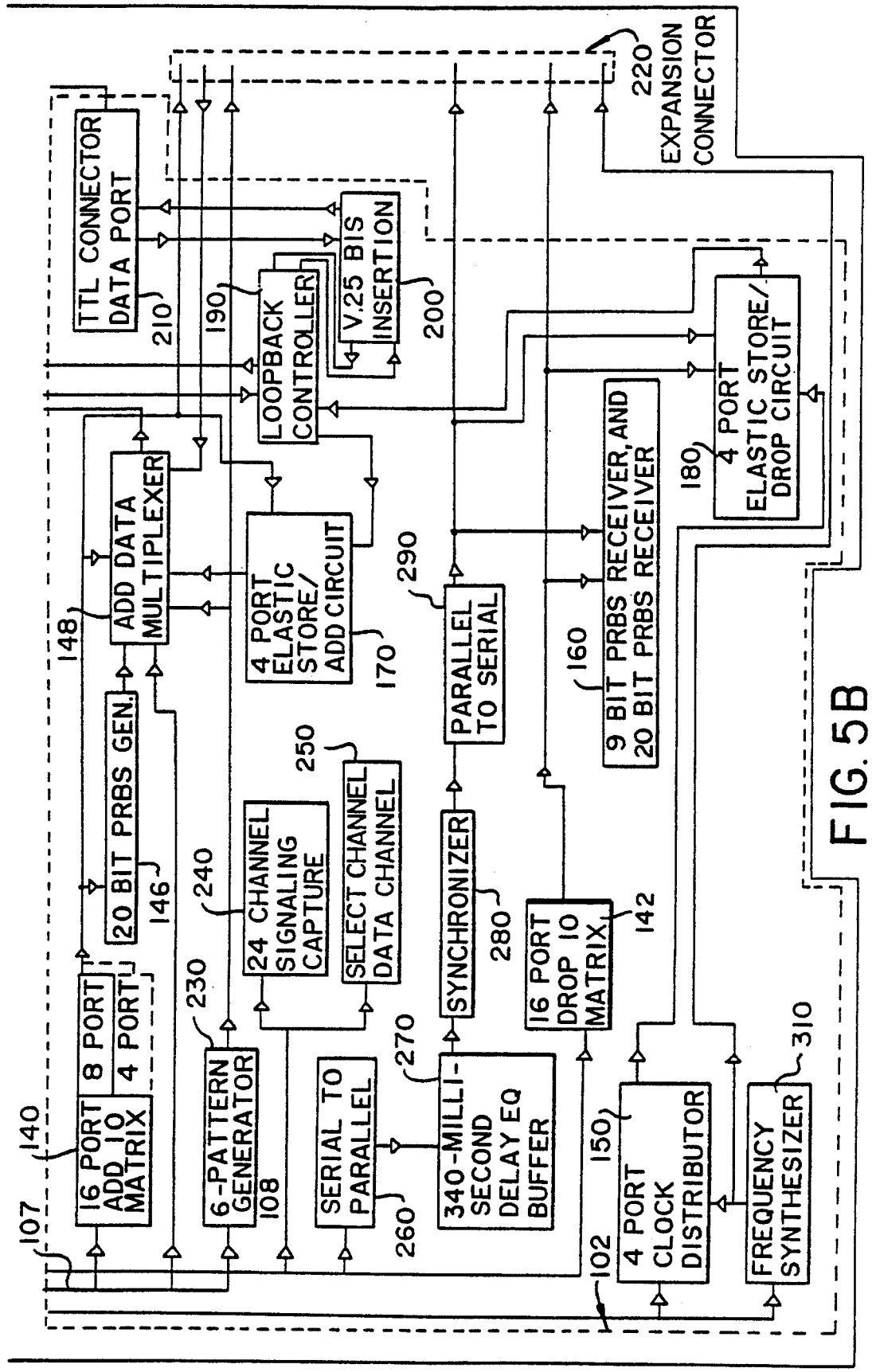
Figure 26:
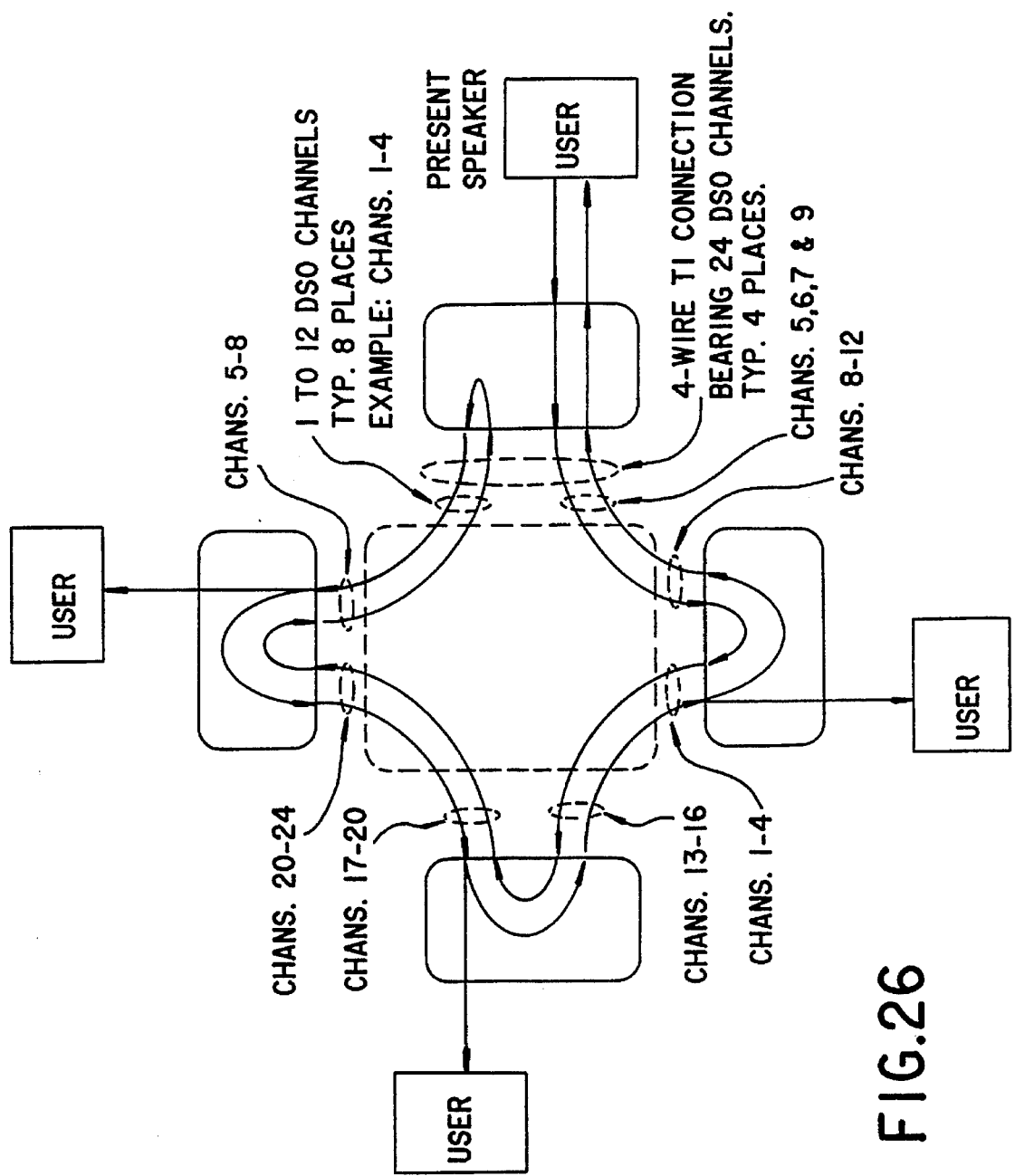
FIG. 26 schematically illustrates data flow in a multichannel network using T-1 framing, with channel assignments being shown.

FIG. 26 schematically illustrates data flow in a multichannel network using T-1 framing, with channel assignments being shown for use with the dialing inverse multiplexer of FIGS. 5A and 5B, identifying specific channels used in each dialing inverse multiplexer. There is a four-wire T-1 connection bearing 24 DS0 channels at each dialing inverse multiplexer. The left side of the SPEAKER dialing inverse multiplexer in this figure uses channels 5, 6, 7, and 9. The right side of the SPEAKER dialing inverse multiplexer in this figure uses channels 1-4. The channel assignments for the other dialing inverse multiplexers can be as shown in FIG. 26. These channel assignments are merely exemplary, however, and it is contemplated that other channel assignments can be used.

Figure 27:
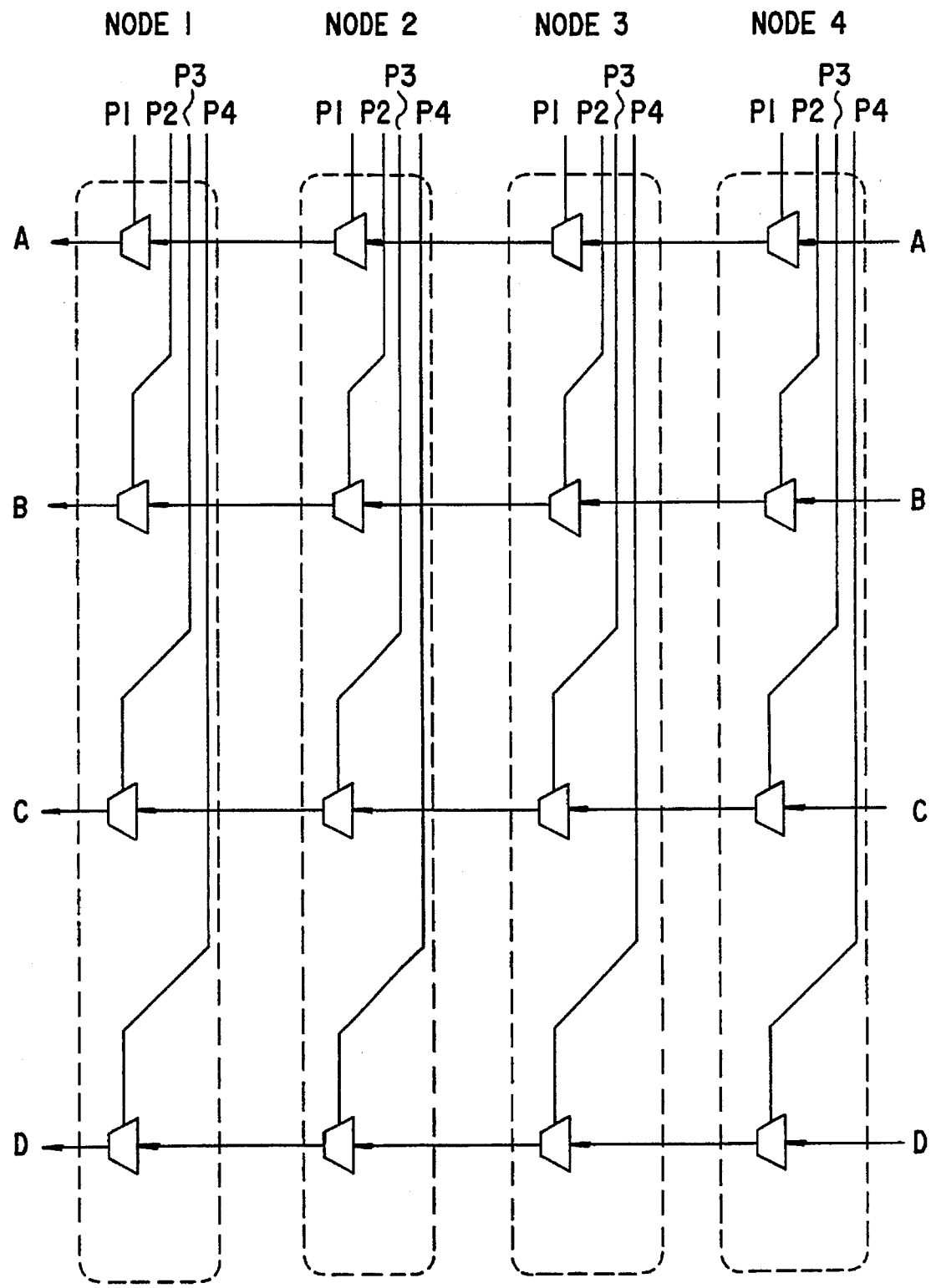
FIG. 27 illustrates the organization of four dialing inverse multiplexers being used to implement multiple conference loops.

FIG. 27 illustrates the organization of four dialing inverse multiplexers being used to implement multiple conference loops. Nodes 1 through 4 represent dialing inverse multiplexers at diverse locations, interconnected by a T1 or E1 path comprised of individual channels which need not be co-routed.

In this case, four simplex, or two duplex paths are implemented. The arrows represent the flow of data around the loop; A, B, C, D each represent arbitrary timeslots or groups of timeslots in the T1 or E1 frame.

Points A are connected together, as are points B, points C and points D, forming a cylinder with four levels of loops. The sum total number of channels included in A, B, C and D is no larger than 24 for T1 and 30 for E1.

Figure 28:
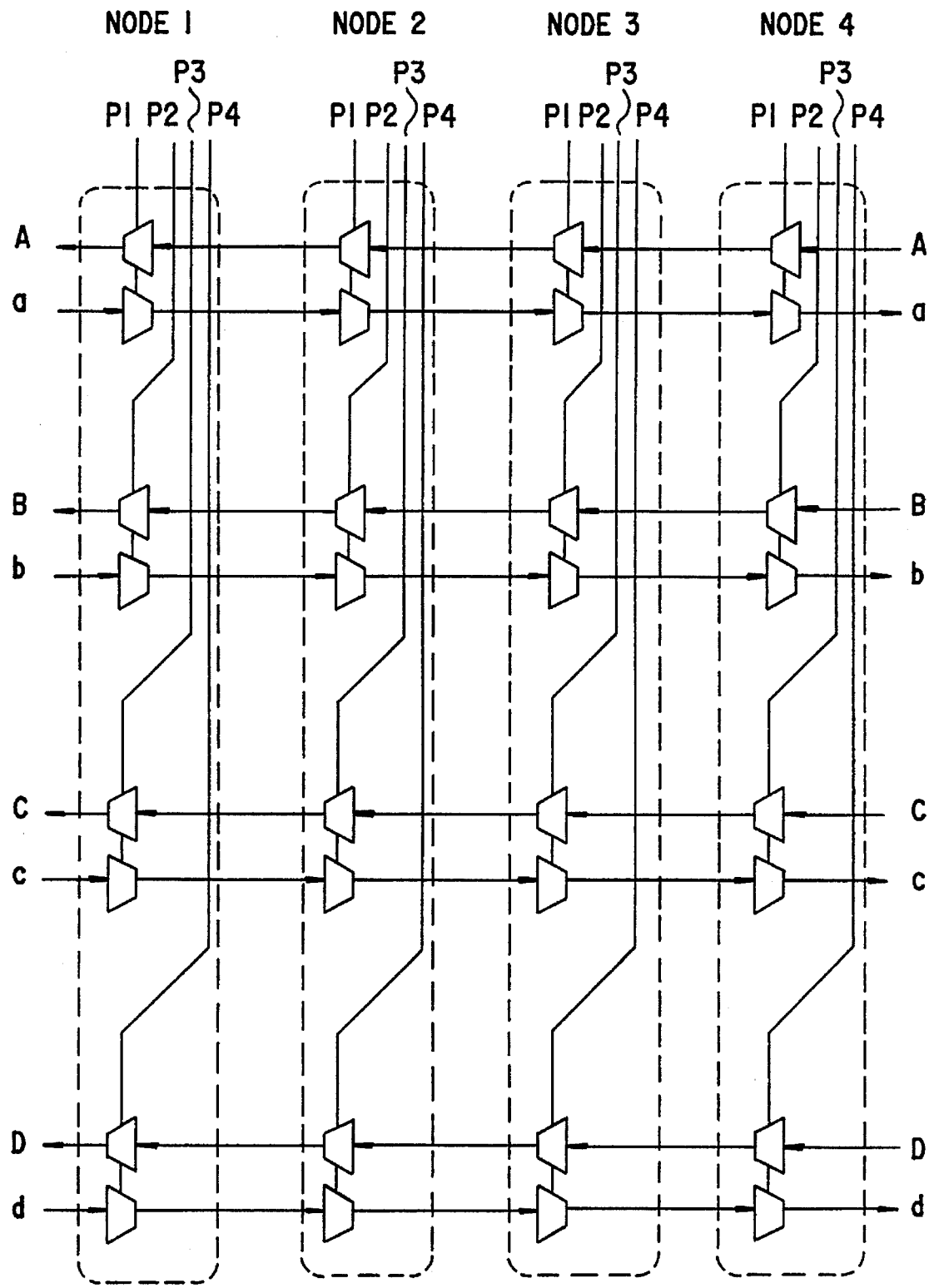
FIG. 28 illustrates the organization of four dialing inverse multiplexers being used to implement multiple conference loops, similar to FIG. 27, but with additional timeslots shown.

FIG. 28 illustrates the organization of four dialing inverse multiplexers being used to implement multiple conference loops, similar to FIG. 27, but with additional timeslots a, b, c, and d which are respectively oppositely directed from timeslots A, B, C, and D. Nodes 1 through 4 represent dialing inverse multiplexers at diverse locations, interconnected by a T1 or E1 path comprised of individual channels which need not be co-routed.

In FIGS. 27 and 28, each trapezoidal block represents an add/drop function with the T1 or E1 data moving from right to left and left to right through the block. User data is dropped or added at any of four ports labeled P1, P2, P3 and P4 for each dialing inverse multiplexer. There is no limit to the number of dialing inverse multiplexers (nodes) which can be arranged in the loop. The number of levels, or independent loops, is limited by the T1 or E1 bandwidth and the bandwidth demanded by each node.

Figure 29:
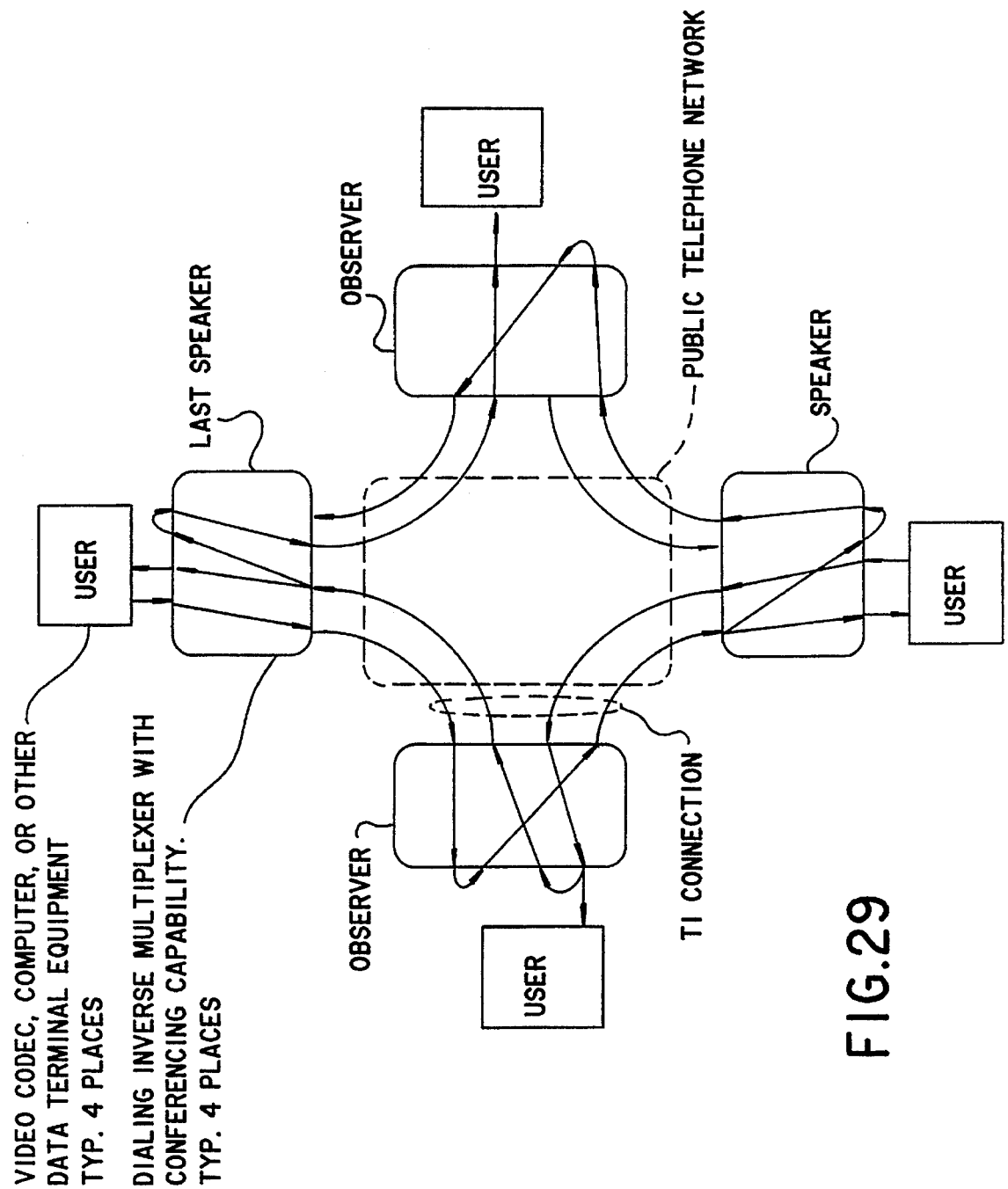
FIG. 29 schematically illustrates data flow along a bidirectional loop.

FIG. 29 schematically illustrates data flow along a bidirectional loop (similar to that shown in FIG. 8). The flow of data is schematically indicated for the speaker, the last speaker, and the observers. The operation of this type of loop is as described above with respect to FIG. 8.

Figure 30:
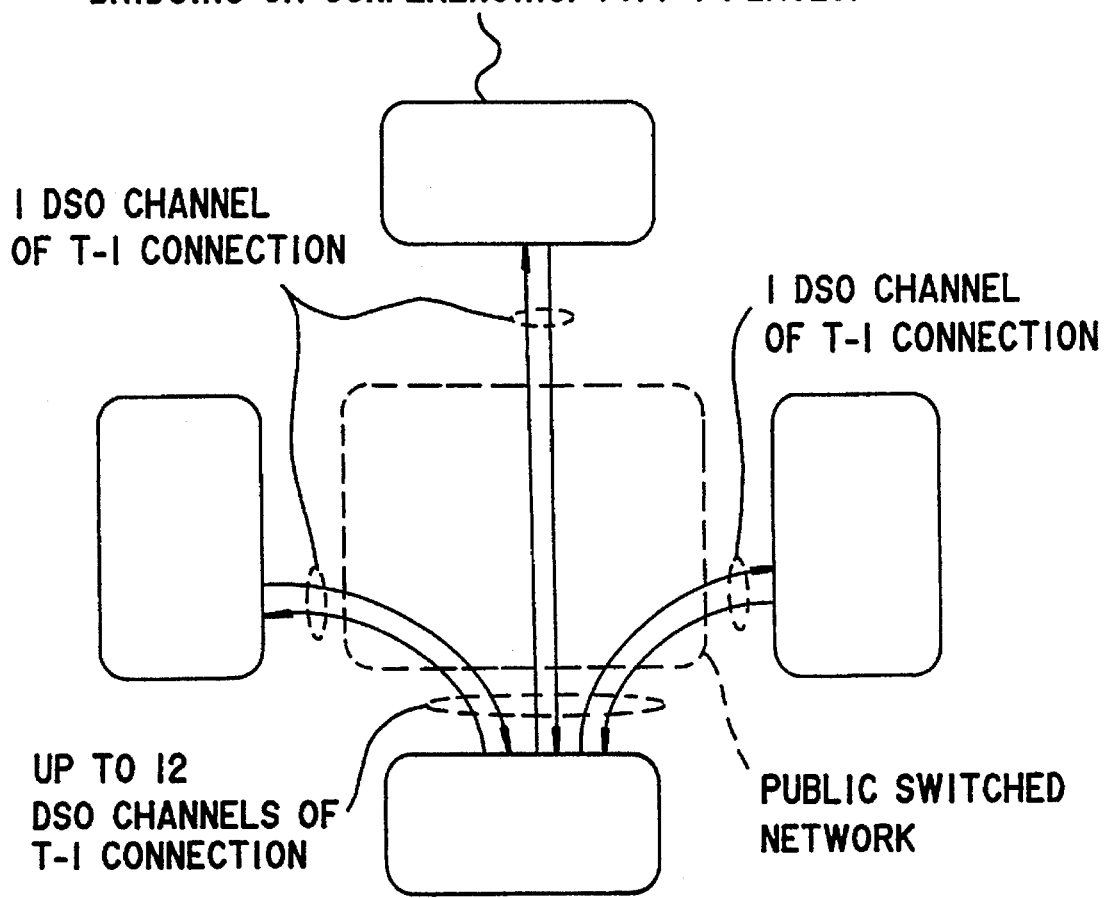
FIG. 30 schematically illustrates conference establishment, i.e. setup of the network or loop, from a first dialing inverse multiplexer.

FIG. 30 schematically illustrates conference establishment, i.e. setup of the network or loop, from a first dialing inverse multiplexer. Up to twelve DS0 channels are initially used in the T-1 connection. Each of the other desired nodes (each having a dialing inverse mulitiplexer) are called by the initiating one of the dialing inverse multiplexers, in the manner described hereinabove with respect to FIG. 21.

While a preferred embodiment has been described and illustrated, and other embodiments shown, it will be understood that the present invention is not limited thereto but may be otherwise embodied within the scope of the following claims.

What is claimed is:
1. A high bandwidth data loop, comprising:
a plurality of individual dial-up circuits of a telephone network;
a plurality of communication means respectively disposed at a plurality of locations for selectively accessing ones of said plurality of circuits so as to provide selectable single or multi-channel bandwidth or bit rate between any number of locations, for an indeterminate and controllable period of time; wherein said individual dial-up circuits are respectively terminated by ones of said plurality of communication means; and
a plurality of data switching means respectively disposed at said plurality of locations for changing data flow between a receiving mode which is not a SPEAKER mode and a transmitting mode which is a SPEAKER mode at a corresponding one of said plurality of communication means, and each of said plurality of data switching means having a switch for controlling operation between said transmitting mode and said receiving mode, wherein each of said plurality of communication means are selectively controllable by operation of a selected one of said plurality of data switching means at a selected one of said plurality of locations to cause transmission from a corresponding selected one of said plurality of communication means at said selected location to all other ones of said plurality of communication means at all other locations such that said selected location is in a SPEAKER mode and said selected location is a SPEAKER node, and all other ones of said plurality of communication means at all other locations are not in said SPEAKER mode; and wherein actuation of each said switch changes operation of the respective one of said plurality of data switching means to switch operation between said SPEAKER mode and said receiving mode.

2. The high bandwidth data loop as claimed in claim 1, in which said plurality of circuits respectively interconnecting said locations are arranged as a loop.

3. The high bandwidth data loop as claimed in claim 2, wherein a plurality of video systems are respectively connected to said telephone network at said locations, and said communication means are capable of bridging said plurality of video systems.

4. The high bandwidth data loop as claimed in claim 2, wherein a plurality of video systems are respectively connected to said telephone network at said locations, said plurality of video systems comprises at least three video systems, and said loop is capable of providing video conferencing among said at least three video systems.

5. The high bandwidth data loop as claimed in claim 1, wherein said communication means is capable of replicating and re-transmitting a received data stream in real time, bit for bit.

6. The high bandwidth data loop as claimed in claim 1, wherein each of the locations is connected by a plurality of channels.

7. A high bandwidth data loop as claimed in claim 6, wherein said plurality of channels carries digital data representing video traffic.

8. The high bandwidth data loop as claimed in claim 6, wherein said plurality of channels carry digital data representing voice traffic.

9. The high bandwidth data loop as claimed in claim 6, wherein said plurality of channels carry graphic images, said plurality of channels carrying digital data in parallel.

10. The high bandwidth data loop as claimed in claim 6, comprising at least an additional channel capable of carrying out-of-band traffic in parallel with other, in-band traffic.

11. The high bandwidth data loop as claimed in claim 1, wherein said plurality of circuits can include radio frequency transmission, copper circuits, fiber optic circuits, electromagnetic circuits, or acoustical paths.

12. The high bandwidth data loop as claimed in claim 1, wherein said selected one of said plurality of data switching means is a voice-controlled switch.

13. The high bandwidth data loop as claimed in claim 1, wherein actuation of said selected one of said plurality of data switching means causes a control signal to be superimposed on the data being transmitted by said SPEAKER node, for in-band signalling.

14. The high bandwidth data loop as claimed in claim 1, wherein said communication means at said plurality of said locations constitutes a respective plurality of nodes, and actuation of said selected one of said plurality of data switching means causes control information to be passed by said SPEAKER node to other ones of said plurality of nodes on a separate channel from the data transmission, for out-of-band communication of the control signal.

15. A high bandwidth data bus which uses a plurality of individual dial-up circuits of a telephone network, comprising:

a plurality of communication means respectively disposed at a plurality of locations for selectively accessing ones of said plurality of circuits so as to provide selectable single or multi-channel bandwidth or bit rate between any number of locations, for an indeterminate and controllable period of time; wherein said individual dial-up circuits are respectively terminated by ones of said plurality of communication means; and a plurality of data switching means respectively disposed at said plurality of locations for changing data flow between a receiving mode which is not a SPEAKER mode and a transmitting mode which is a SPEAKER mode at a corresponding one of said plurality of communication means, wherein each of said plurality of communication means are selectively controllable by operation of a corresponding selected one of said plurality of data switching means at a selected one of said plurality of locations to cause transmission from a corresponding one of said plurality of communication means at said selected location to all other ones of said plurality of communication means at all other locations such that said selected location is in a SPEAKER mode and said selected location is a SPEAKER node, and all other ones of said plurality of communication means at all other locations are not in said SPEAKER mode.

16. The high bandwidth data bus as claimed in claim 15, in which said plurality of circuits respectively interconnecting said locations are arranged as a loop.

17. The high bandwidth data bus as claimed in claim 16, wherein a plurality of video systems are respectively connected to said telephone network at said locations, and said communication means are capable of bridging said plurality of video systems.

18. The high bandwidth data bus as claimed in claim 16, wherein a plurality of video systems are respectively connected to said telephone network at said locations, said plurality of video systems comprises at least three video systems, and said loop is capable of providing video conferencing among said at least three video systems.

19. The high bandwidth data bus as claimed in claim 15, wherein said communication means is capable of replicating and re-transmitting a received data stream in real time, bit for bit.

20. The high bandwidth data bus as claimed in claim 15, wherein each of the locations is connected by a plurality of channels.

21. The high bandwidth data bus as claimed in claim 20, wherein said plurality of channels carries video traffic.

22. The high bandwidth data bus as claimed in claim 20, wherein said plurality of channels carry voice traffic.

23. The high bandwidth data bus as claimed in claim 20, wherein said plurality of channels carry graphic images, said plurality of channels carrying the high bandwidth data in parallel.

24. The high bandwidth data bus as claimed in claim 20, comprising at least an additional channel capable of carrying out-of-band traffic in parallel with other, in-band traffic.

25. The high bandwidth data bus as claimed in claim 15, wherein said plurality of circuits can include radio frequency transmission, copper circuits, fiber optic circuits, electromagnetic circuits, or acoustical paths.

26. The high bandwidth data bus as claimed in claim 15, wherein said selected one of said plurality of data switching means is a voice-controlled switch.

27. The high bandwidth data bus as claimed in claim 15, wherein actuation of said selected one of said plurality of data switching means causes a control signal to be superimposed on the data being transmitted by said SPEAKER node, for in-band signalling.

28. The high bandwidth data bus as claimed in claim 15, wherein said communication means at said plurality of said locations constitutes a respective plurality of nodes, and actuation of said selected one of said plurality of data switching means causes control information to be passed by said SPEAKER node to other ones of said plurality of nodes on a separate channel from the data transmission, for out-of-band communication of the control signal.

* * * * *